United States Patent
Sohn et al.

(10) Patent No.: US 6,456,583 B1
(45) Date of Patent: Sep. 24, 2002

(54) DISK PLAYER, AND TURNTABLE INCORPORATING SELF-COMPENSATING DYNAMIC BALANCER, CLAMPER INCORPORATING SELF-COMPENSATING DYNAMIC BALANCER AND SPINDLE MOTOR INCORPORATING SELF-COMPENSATING DYNAMIC BALANCER ADOPTED FOR DISK PLAYER

(75) Inventors: Jin-seung Sohn, Seoul (KR); Dae-sung Ro, Anyang (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/487,245

(22) Filed: Jan. 20, 2000

Related U.S. Application Data

(62) Division of application No. 08/947,895, filed on Oct. 9, 1997.
(60) Provisional application No. 60/027,987, filed on Oct. 9, 1996, and provisional application No. 60/040,768, filed on Mar. 14, 1997.

(30) Foreign Application Priority Data

| Oct. 9, 1996 | (KR) | 96-44932 |
| Jan. 10, 1997 | (KR) | 97-503 |

(51) Int. Cl.[7] ............... G11B 19/20; G11B 17/028
(52) U.S. Cl. ........................ 369/270; 369/264
(58) Field of Search ................ 369/264, 270, 369/263; 74/573 R, 573 F

(56) References Cited

U.S. PATENT DOCUMENTS

| 3,410,154 A | 11/1968 | Dealom ................... 74/573 |
| 3,799,619 A | 3/1974 | LaBarber ............... 301/5 BA |
| 3,854,347 A | 12/1974 | Hellerich ................. 74/573 |
| 4,808,441 A * | 2/1989 | Chatthqa et al. ......... 427/386 |
| 5,130,870 A | 7/1992 | Jabbari ................. 360/99.08 |
| 5,537,272 A | 7/1996 | Kazmierczak et al. ... 360/99.08 |
| 6,198,715 B1 * | 3/2001 | Kouno et al. ............ 369/247 |
| 6,295,269 B1 * | 9/2001 | Takeuchi et al. ......... 369/263 |

FOREIGN PATENT DOCUMENTS

| EP | 0 434 270 A2 | 6/1991 |
| EP | 0 829 872 | 3/1998 |

(List continued on next page.)

OTHER PUBLICATIONS

Patent Abstracts of Japan vol. 014, No. 376 (P–1092), Aug. 14, 1990 & JP 02 139758 A(Canon Inc.) May 29, 1990 * Abstract.
Patent Abstracts of Japan vol. 015, No. 266 (P–1223) Jul. 5, 1991 & JP 03 086968 A (Fujitsu Ltd) Apr. 11, 1991 * Abstract.
*Transactions of the Japan Society of Mechanical Engineers*, Jun. 1979.

Primary Examiner—William Klimowicz
(74) Attorney, Agent, or Firm—Sughrue Mion, PLLC

(57) ABSTRACT

A disk player having a self-compensating dynamic balancer which can limit internal vibrations generated by an eccentric center of gravity of a disk, and a turntable, a clamper and a spindle motor which incorporate a self-compensating dynamic balancer. The self-compensating dynamic balancer is formed integrally with rotating members in a disk player; that is, a turntable, a clamper and/or a rotor of a spindle motor. The self-compensating dynamic balancer includes at least one race which is integrally formed with the rotating member and rotates around a rotational shaft, a mobile unit which is located in the race to be capable of moving, and a cover member for covering an opening of the race. Thus, internal vibrations occurring due to the eccentric center of gravity of the disk can be effectively limited by the self-compensating dynamic balancer in which the mobile unit is disposed far away from the center of orbital rotation by a centrifugal force during rotation of the disk.

22 Claims, 21 Drawing Sheets

FOREIGN PATENT DOCUMENTS

| | | |
|---|---|---|
| JP | 58-133673 A | 8/1983 |
| JP | 62-24052 | 2/1987 |
| JP | 10-83622 | 3/1998 |
| JP | 10-92094 | 4/1998 |
| JP | 1-243604 | 9/1998 |
| JP | 11-4558 | 1/1999 |
| WO | WO 93/23687 | 11/1993 |
| WO | WO 98/03974 | 1/1998 |

* cited by examiner

DISK PLAYER, AND TURNTABLE INCORPORATING SELF-COMPENSATING DYNAMIC BALANCER, CLAMPER INCORPORATING SELF-COMPENSATING DYNAMIC BALANCER AND SPINDLE MOTOR INCORPORATING SELF-COMPENSATING DYNAMIC BALANCER ADOPTED FOR DISK PLAYER

This is a divisional of application Ser. No. 08/947,895 filed Oct. 9, 1997, the disclosure of which is incorporated herein by reference. Application Ser. No. 08/947,895, was filed under 35 U.S.C. §111(a) claiming benefit pursuant to 35 U.S.C. §119(e)(1) of the filing dates of Provisional Application Nos. 60/027,987 and 60/040,768 filed on Oct. 9, 1996 and Mar. 14, 1997, respectively, pursuant to 35 U.S.C. §111(b).

BACKGROUND OF THE INVENTION

1. Field of the Invention

The present invention relates to a disk player, and a turntable, a clamper and a spindle motor which are adopted for the same and, more particularly, to a disk player having a self-compensating dynamic balancer for restricting internal vibrations generated due to an eccentric center of gravity of a disk, and a turntable incorporating the self-compensating dynamic balancer, a clamper incorporating the self-compensating dynamic balancer and a spindle motor incorporating the self-compensating dynamic balancer which are adopted for the same.

2. Description of the Related Art

In general, a disk player records and/or reads information onto and/or from a recording medium such as a compact disk (CD), a CD-ROM and a digital versatile disk (DVD). Due to its sensitivity, the disk player is required to protect the disk and optical pickup from external impacts and internal vibrations.

A typical disk player, as shown in FIG. 1, includes a deck base 10 hinge-coupled to a housing (not shown) to be capable of rotating vertically, a deck plate 20 coupled to the deck base 10, a spindle motor 21 installed at the deck plate 20 for providing a rotational force to a disk 1, a turntable 23 coupled to a rotational shaft 22 of the spindle motor 21 for accommodating the disk 1, a damper 40 installed on the inner surface of the upper portion of the housing to face the turntable 23 for securing the disk 1 placed on the turntable 23, and an optical pickup 25 coupled to the deck plate 20 to be capable of moving across the disk 1 for performing recording and reproduction operations. The disk player includes buffering members 30 disposed between the deck base 10 and the deck plate 20 to prevent the external vibrations transferred through the deck base 10 from being transferred directly to the deck plate 20, the spindle motor 21 and the optical pickup 25. The buffering members 30 are formed of a material such as soft rubber or polyurethane which can absorb external impacts.

The disk player adopting the buffering members 30 as above can effectively protect the driving of the disk 1 and the optical pickup 25 from external impacts. However, a method of dampening internal vibrations generated by the rotation of the spindle motor 21 due to an eccentric center of gravity of the disk is not taken into consideration. In such a case, the eccentric center of gravity of the disk is caused by a discrepancy between the rotational center of the disk and the center of gravity of the disk due to errors in the manufacturing process of the disk. Thus, the rotational shaft of the spindle motor 21 s exhibits an orbital revolution due to wobbling of the rotational shaft.

Such orbital revolution of the rotational shaft of the spindle motor does not effect a low-speed disk player such as a 1X or 2X type. However, in the case of a high-speed model such as a 6X, 8X, 12X, 20X or 24X type, the effects of the orbital revolution of the rotational shaft of the spindle motor become serious making the recording/reproducing of information difficult.

To overcome the above problems, in a conventional high-speed disk player, the mass of the deck plate where the spindle motor is installed is increased or the rigidity of the buffering members is increased to reduce movements of the deck plate due to the eccentric center of gravity of the disk.

However, not only is the deck plate having increased mass inappropriate for a high speed rotation, but also the costs of the product increase and miniaturization of the product is hindered. Also, when the rigidity of the buffering members is increased, it is not possible to effectively dampen the external impacts or vibrations.

SUMMARY OF THE INVENTION

To solve the above problems, it is a first objective of the present invention to provide a disk player in which external vibrations can be reduced and also internal vibrations generated due to an eccentric center of gravity of a disk can be limited without an increase in weight.

It is a second objective of the present invention to provide a turntable incorporating a self-compensating dynamic balancer, which is employed in a disk player so that the internal vibrations due to an eccentric center of gravity of a disk can be limited.

It is a third objective of the present invention to provide a damper incorporating a self-compensating dynamic balancer, which is employed in a disk player so that the internal vibrations due to an eccentric center of gravity of a disk can be limited.

It is a fourth objective of the present invention to provide a spindle motor incorporating a self-compensating dynamic balancer, which is employed in a disk player so that the internal vibrations due to an eccentric center of gravity of a disk can be limited.

Accordingly, to achieve the first objective, there is provided a disk player comprising a deck base, a deck plate elastically coupled to the deck base, at least one buffering member interposed between the deck base and the deck plate for protecting the deck plate from external impacts, a spindle motor having a rotational shaft and being mounted to the deck plate for providing a rotational force to a disk, a turntable mounted to the rotational shaft of the spindle motor for accommodating the disk, a clamper for holding the disk in place on the turntable, an optical pickup installed at the deck plate to be capable of moving across the disk, and a self-compensating dynamic balancer mounted to at least one among members which are rotated by the rotational force provided by the spindle motor, the center of gravity of the self-compensating dynamic balancer being located opposite to that of the disk with respect to the rotational shaft of the spindle motor by a centrifugal force generated during rotation of the disk.

To achieve the second objective, there is provided a turntable incorporating a self-compensating dynamic balancer adopted in a disk player comprising a placing member having a coupling hole which is coupled to a rotational shaft of a motor and a surface on which a disk is placed, the placing member being rotated by rotation of the motor, a coupling protrusion which is formed on the placing member to project therefrom and into which the center hole of a disk fits, at least one circular race which is formed in the placing member and rotates around the rotation center of the placing member, a mobile unit which is placed inside the race to be capable of moving, a cover member to cover an opening of the race.

To achieve the third objective, there is provided a damper incorporating a self-compensating dynamic balancer adopted in a disk player comprising a clamper main body, a pressing unit which is installed at the clamper main body for pressing a disk placed on a turntable, at least one circular race which is formed in the clamper main body and rotates around the center of rotation of the damper main body, a mobile unit placed inside the race to be capable of moving, and a cover member which covers an opening of the race.

To achieve the fourth objective, there is provided a spindle motor incorporating a self-compensating dynamic balancer adopted in disk player comprising a rotational shaft, a motor base having a through hole in which the rotational shaft is rotatably inserted, a stator fixedly installed at the motor base and having a yoke and a coil wound around the yoke, a rotor having a case which is fixed to an end of the rotational shaft and encloses the stator, and a magnet which is fixed inside the case to face the yoke, at least one circular race which is integrally formed with the case and rotates around the center of rotation of the rotational shaft, a mobile unit located inside the race to be capable of moving, and a cover member which is coupled to an opening of the race for sealing the inner space of the race.

BRIEF DESCRIPTION OF THE DRAWINGS

The above objectives and advantages of the present invention will become more apparent by describing in detail preferred embodiments thereof with reference to the accompanying drawings, in which.

DETAILED DESCRIPTION OF THE PREFERRED EMBODIMENTS

Figure 1:
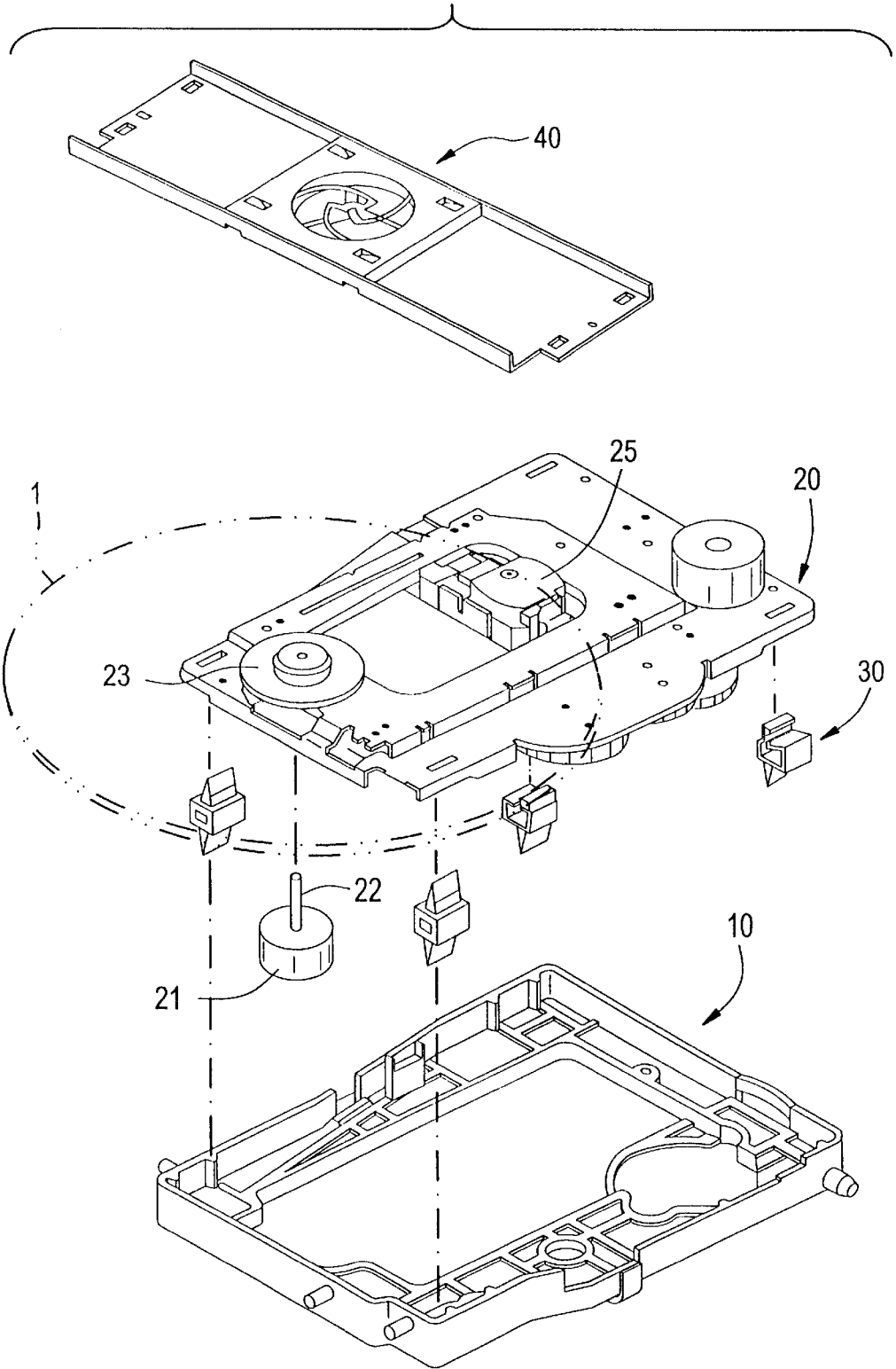
FIG. 1 is an exploded perspective view schematically illustrating a conventional disk player.
Figure 2:
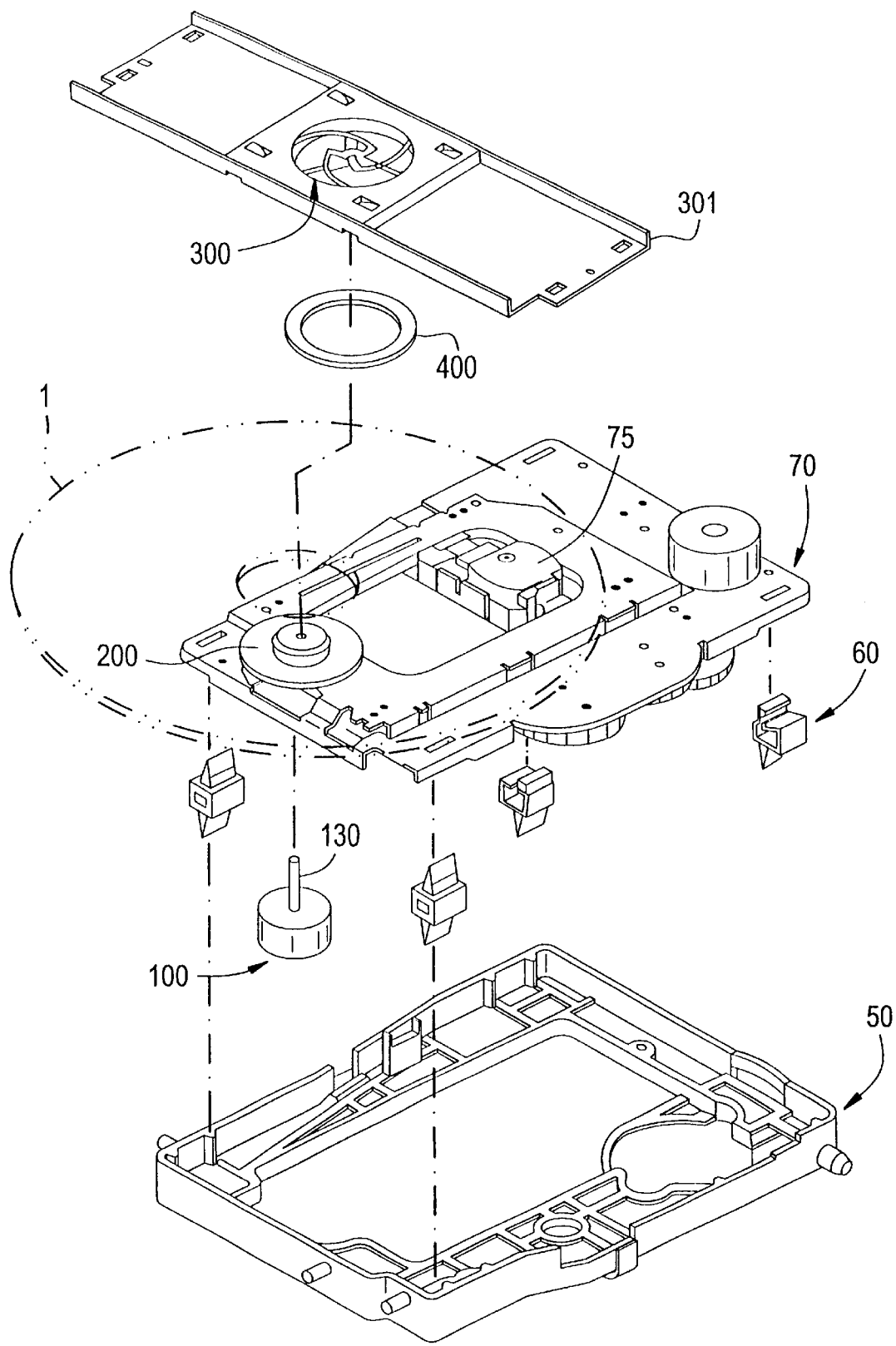
FIG. 2 is an exploded perspective view illustrating a disk player according to an embodiment of the present invention.

As shown in FIG. 2, a disk player according to a preferred embodiment of the present invention comprises a deck base 50, a deck plate 70 elastically coupled to the deck base 50, buffering members 60 interposed between the deck base 50 and the deck plate 70, a spindle motor 100 installed at the deck plate 70, a turntable 200 and an optical pickup 75, a clamper 300 disposed on a bracket 301 and installed to face the turntable 200 for holding a disk 1 placed on the turntable 200, and a self-compensating dynamic balancer 400 for preventing eccentric rotation of a rotational shaft 130 of the spindle motor 100 due to an eccentric center of gravity of the disk 1.

The deck plate 70 receives externally delivered impacts through the deck base 50 which are alleviated by the buffering members 60. Accordingly, it is preferable that the buffering members 60 are formed of material exhibiting low rigidity such as soft rubber or polyurethane in order to alleviate external vibrations delivered from the deck base 50. Also, the deck plate 70 is preferably light in weight for realizing miniaturization thereof. The spindle motor 100 provides a rotational force to rotate the disk 1. The center of the turntable 200 is fixed to the rotational shaft 130 and the disk 1 is placed on the upper surface of the turntable 200 during operation. The damper 300 facing the spindle motor 100 prevents unnecessary movements of the disk 1 placed on the spindle motor 100. The turntable 200 is fixed to the rotational shaft 130 and rotated according to the spindle motor 100. Thus, the disk 1 and the clamper 300 rotate together.

Figure 3A:
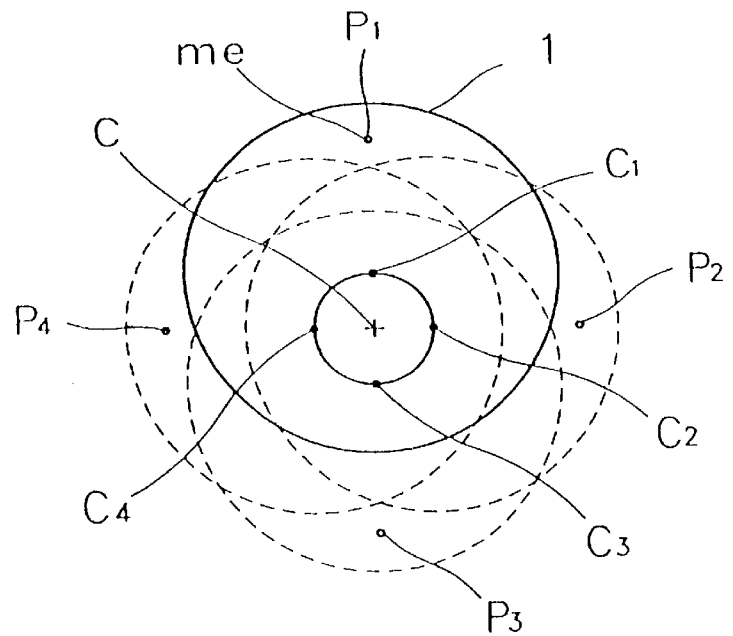
FIGS. 3A, 3B and 3C are diagrams showing the relationship between an eccentric center of gravity position of a disk, the position of a rotational shaft and the center of rotation respectively according to different rotation speeds of the disk.
Figure 3B:
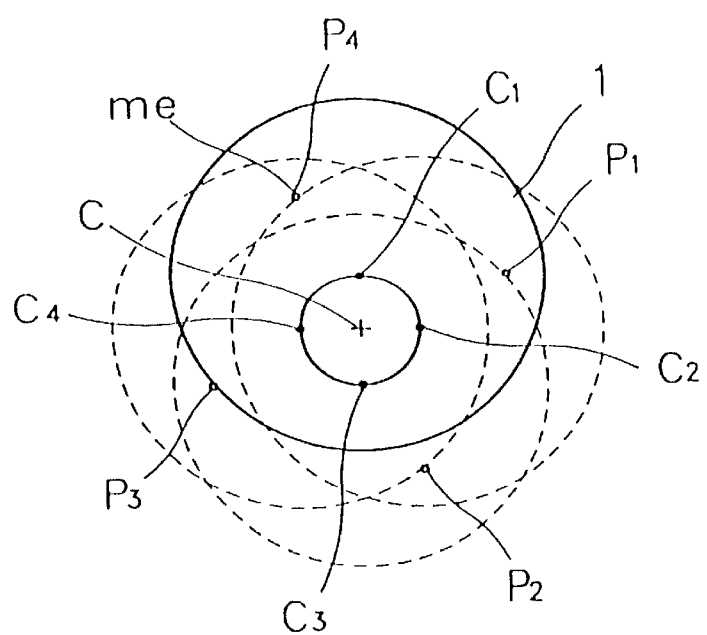
Figure 3C:
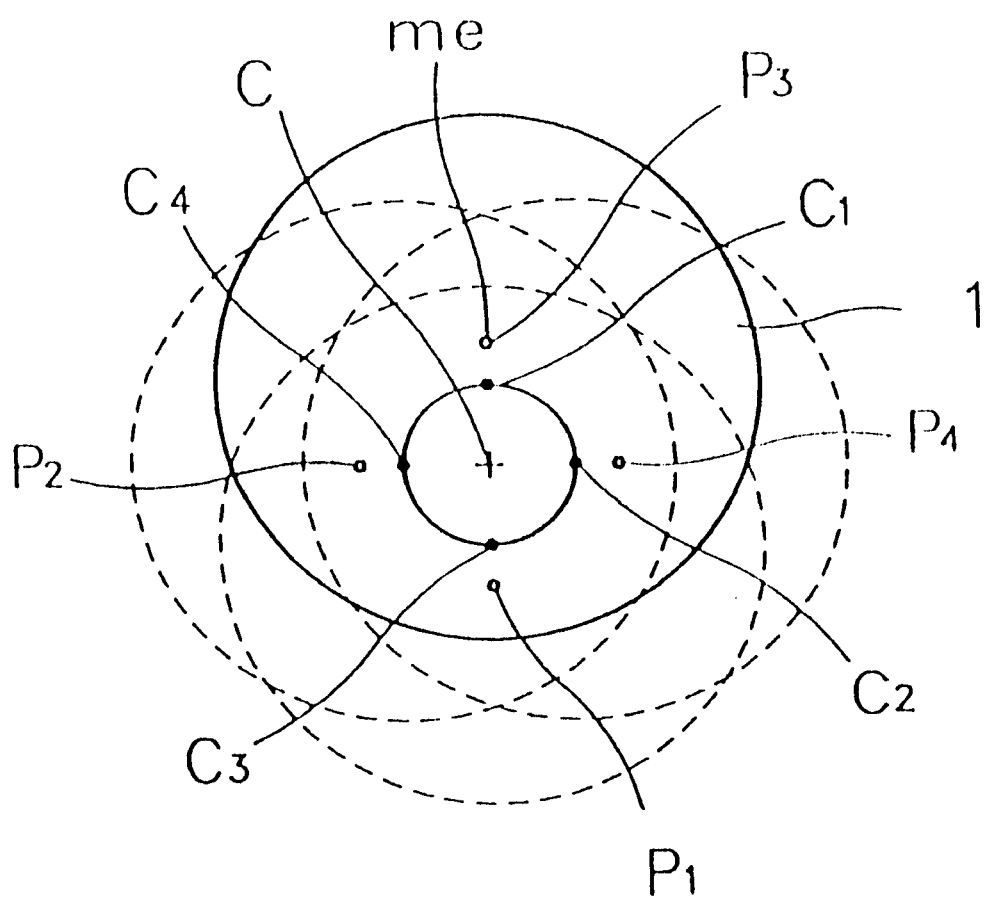

Referring to FIGS. 3A through 3C, the relationship between the eccentric center of gravity position of a disk, the position of the rotational shaft and the ideal center of rotation according to the rotational speed of the disk will now be described.

FIG. 3A is a diagram schematically showing the orbital and rotational movements of the disk when the rate of orbital rotation of the spindle motor is equal to or less than the natural frequency of the deck plate. In this case, the natural frequency is determined by the elastic modulus of the buffering members and mass of the deck plate and other elements to be installed on the deck plate, and represents the rate of vibration in a horizontal direction, i.e., in a direction parallel to the plane of the disk. As shown in the drawing, when an eccentric center of gravity $m_e$, exists at a position $p_1$ spaced apart by a predetermined distance from the ideal rotation center $c_1$ of the disk 1, the ideal rotation center $c_1$ of the disk rotates around a center c, moving to positions $c_2$, $c_3$ and $c_4$. The positions of the eccentric center of gravity $m_e$ of the disk corresponding to each of the ideal rotation center positions $c_2$, $c_3$ and $c_4$ respectively are $p_2$, $p_3$ and $p_4$. In this case, the respective positions $p_1$, $p_2$, $p_3$ and $p_4$ of the eccentric center of gravity $m_e$ and the revolution center c of the disk 1 are located opposite each other with respect to each of the ideal rotation center positions $c_1$, $c_2$, $c_3$ and $c_4$ of the disk 1.

FIG. 3B is a diagram schematically showing the orbital and rotational movements of the disk when the rate of revolution of the spindle motor is near the natural frequency of the deck plate. As shown in the drawing, the revolution center c is located in a direction perpendicular to that of the respective eccentric center of gravity positions $p_1$, $p_2$, $p_3$ and $p_4$ with respect to positions $c_1$, $c_2$, $c_3$ and $c_4$.

FIG. 3C is a diagram schematically showing the orbital and rotational movements of the disk when the rate of revolution of the spindle motor is greater than the natural frequency of the deck plate, which corresponds to the normal rotation speed of a disk allowing information to be recorded onto or read from the disk. As shown in the drawing, the revolution center c is located in the same direction as the respective eccentric center of gravity positions $p_1$, $p_2$, $p_3$ and $p_4$ with respect to positions $c_1$, $c_2$, $c_3$ and $c_4$.

In the present invention, it is a characteristic feature that the self-compensating dynamic balancer (400 of FIG. 2) is provided to compensate for the eccentricity of the disk.

The self-compensating dynamic balancer 400 is incorporated into at least one of the rotor of the spindle motor 100, the rotational shaft 130, the turntable 200 and the clamper 300 which are rotated by the rotational force provided from the spindle motor 100.

Figure 4A:
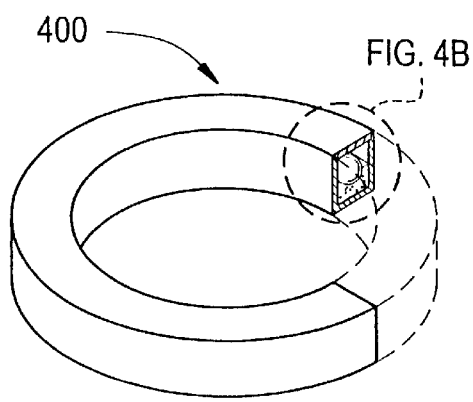
FIGS. 4A and 4B are perspective views illustrating a first embodiment of a self-compensating dynamic balancer which is employed in a disk player according to the present invention.
Figure 4B:
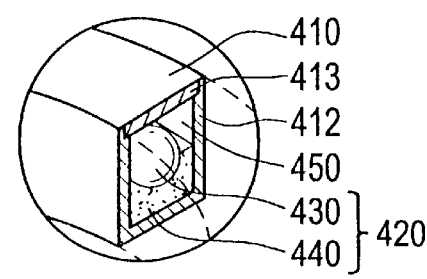

As shown in FIG. 4, a first embodiment of the self-compensating dynamic balancer 400 includes a circular tube 410 whose cross-section is rectangular having a race 450 and a mobile unit 420 movably disposed inside the race 450.

The tube 410 includes a main body 412 through which the race 450 is formed and a cover member 413 for sealing the race 450 in a state in which the mobile unit 420 is sealed therein. The tube 410 rotates coaxially with the rotational shaft 130.

The coupling between the cover member 413 to the main body 412 is made by using an adhesive, a groove and protrusion assembly formed on the cover member 413 and main body 412 at corresponding positions, or a screw. The detailed description thereof will be omitted since such coupling methods are well known.

The mobile unit 420 includes a plurality of rigid bodies 430 and/or a fluid 440 which can move outward from the rotational center by a centrifugal force generated during rotation of the tube 410.

Figure 5:
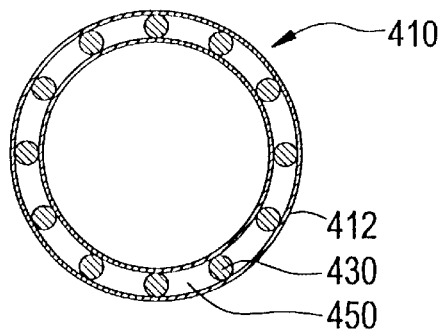
FIG. 5 is a cross sectional view of the self-compensating dynamic balancer shown in FIG. 4 when a rigid body is used as a mobile unit.

FIG. 5 shows the race 450 in which a plurality of rigid bodies 430 is included as the mobile unit 420. Each rigid body 430 is installed to be capable of freely rolling or sliding so that the position thereof can be determined by the centrifugal force during rotation of the tube 410.

Figure 6:
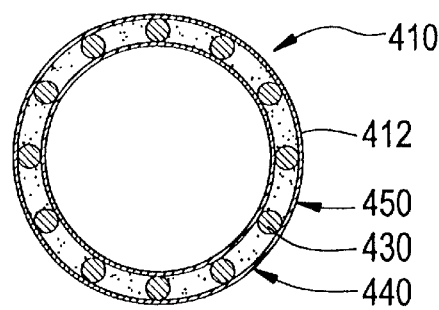
FIG. 6 is a cross sectional view of the self-compensating dynamic balancer shown in FIG. 4 when a rigid body and a fluid are used as the mobile unit.

FIG. 6 shows the race 450 in which a plurality of the rigid bodies 430 and the fluid 440 are included.

Since the fluid 440 has a large contact area with the race 450 and the cover member 413 (see FIG. 4) and exhibits a very high viscosity compared to the rigid body 430 only, the fluid 440 employed with the rigid bodies 430 in the race 450 can effectively compensate for an internal vibratory force generated due to the eccentric center of gravity of the disk 1 (see FIG. 2). That is, the orbital revolution of the rotational shaft 130 due to the eccentric center of gravity $m_e$ of the disk can be roughly balanced and reduced by the movements of the rigid bodies 430 and finely balanced and reduced by the fluid 440.

The amount of fluid 440 that can be included ranges from an amount which coats the outer surface of the rigid bodies 430 to a thickness of only a few microns. In this case, the fluid 440 reduces friction between the rigid bodies 430, the race 450 and the cover member 414, rather than actually contributing to balancing.

Figure 7:
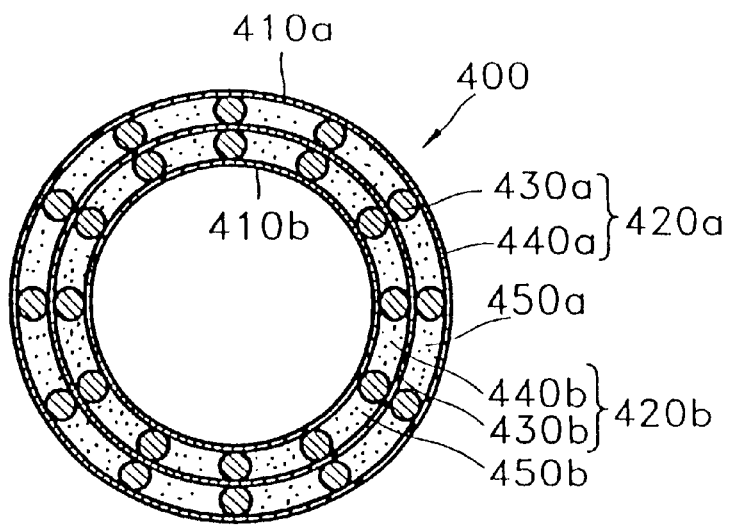
FIGS. 7 and 8 are cross sectional views of self-compensating dynamic balancers including first and second races, respectively.

As shown in FIG. 7, the second embodiment of the self-compensating dynamic balancer includes first and second rectangular cross-sectioned tubes 410a and 410b arranged concentrically and adjacent to each other and first and second mobile units 420a and 420b respectively disposed inside the first and second tubes 410a and 410b to be capable of moving.

The respective first and second tubes 410a and 410b independently serve as a balancer and can finely balance and reduce the orbits of the rotational shaft 130. In this case, since each of the first and second mobile units 420a and 420b is actually the same as that of the mobile unit 420 described with reference to FIGS. 5 and 6, a detailed description thereof will be omitted.

Figure 8:
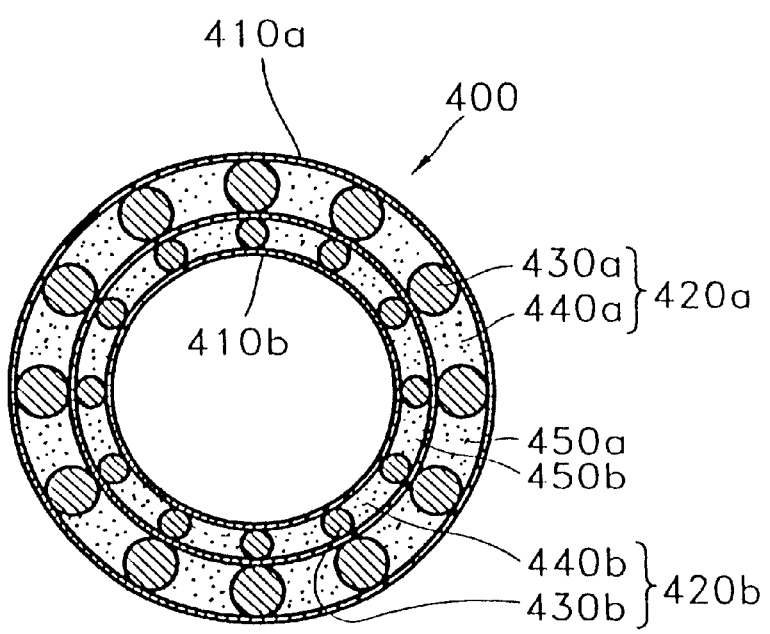

The first and second tubes 410a and 410b and the mobile units 420a and 420b respectively installed therein can be configured as shown in FIG. 8. That is, the width and height of the first race 450a formed in the first tube 410a can be configured different from those of the second race 450b formed in the second tube 410b. Also, the size and density of the first and second mobile units 420a and 420b located in the first race 450a and the second race 450b, respectively, can be made different from each other. In this case, since each of the first and second mobile units 420a and 420b is actually the same as the mobile unit 420 described with reference to FIGS. 5 and 6, a detailed description thereof will be omitted.

When the first race 450a is formed to have a width and height greater than the second race 450b and the first mobile unit 420a which is heavier than the second mobile unit 420b is employed, the first mobile unit 420a roughly balances and reduces the orbital rotation of the rotational shaft 130 due to the eccentric center of gravity $m_e$ of the disk 1, and then the second mobile unit 420b finely balances and reduces the orbital rotation of the rotational shaft 130.

The self-compensating dynamic balancer described with reference to FIGS. 7 and 8 can have two or more tubes.

Figure 9:
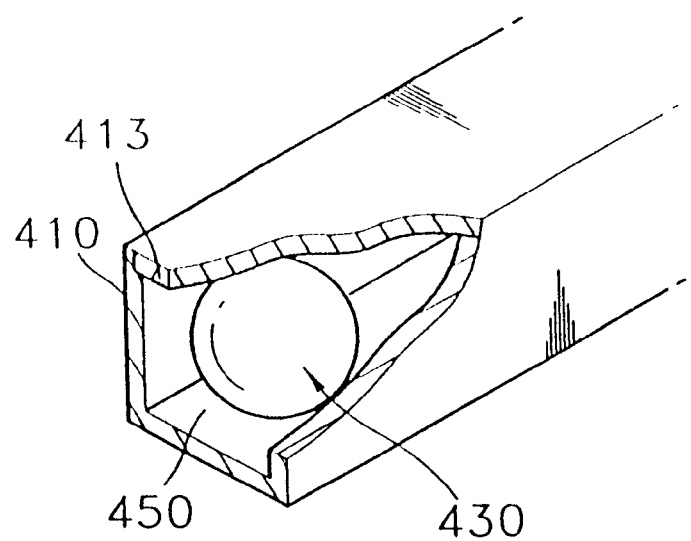
FIGS. 9 through 12 are cutaway perspective views schematically illustrating the shapes of a rigid body which is used as the mobile unit for the self-compensating dynamic balancer according to the embodiment of the present invention.
Figure 10:
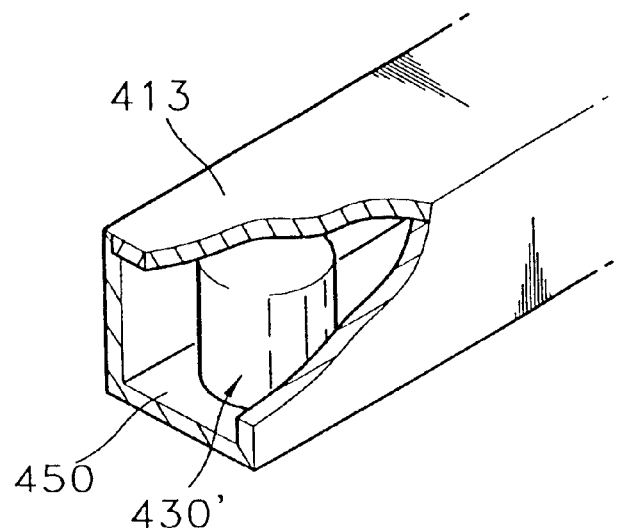
Figure 11:
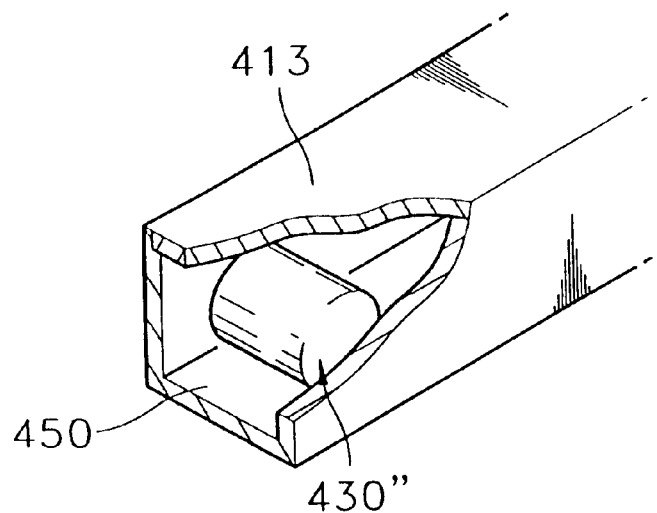

FIGS. 9 through 11 show different shapes and arrangements of the rigid body as rigid bodies 430, 430', and 430" installed inside the race 450.

FIG. 9 shows a case in which the rigid body 430 is spherical.

FIG. 10 shows a case in which the rigid body is cylindrical. The cylindrical rigid body 430' is formed to be capable of rolling with the outer surface of the cylindrical rigid body 430' contacting the inner surfaces of the inner and outer walls of the race 450. In this case, the upper and lower flat surfaces of the cylindrical rigid body 430' may slide in contact with the race 450 generating friction therebetween. In consideration of the above, the race 450 preferably has the shape shown in FIG. 16 which will be described later.

FIG. 11 shows a case in which the rigid body is a truncated conic body 430" which can roll with the outer conic surface contacting the bottom surface of the inside of the race 450.

Figure 12:
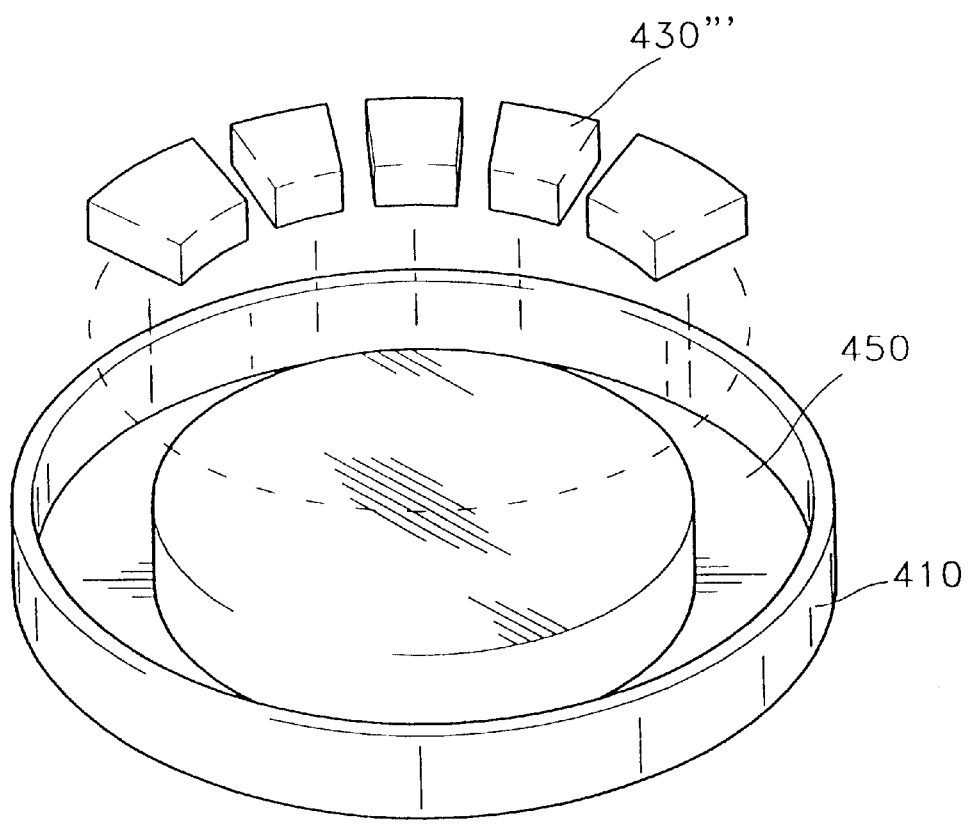

Also, FIG. 12 shows a case in which the rigid body is a fan-shaped block 430'" which is inserted to be capable of sliding while contacting the bottom surface and the outer circumferential surface inside the race 450.

Also, the shape of the rigid body 430 may be modified into other shapes as long as the body can freely move inside the race 450.

Moreover, when being influenced by a magnetic force, there may be a possibility that the rigid body 430 cannot roll smoothly due to magnetic attraction. Accordingly, it is preferable that the rigid body 430 is formed of a non-magnetic substance so that the rigid body 430 is not influenced by a magnet (not shown).

Preferably, the rigid body 430 is formed of tungsten carbide (WC), beryllium steel (CuBe), Hastelloy C-276, silicon nitride ($Si_3N_4$), zirconia ($ZrO_2$), austenite-series stainless steel YHD50, a non-magnetic metal such as SUS300, SUS304 and SUS316, ceramic or a synthetic resin.

As described above, when the rigid body 430 is formed of a non-magnetic substance, the rigid body 430 is not influenced by a magnetic force from an adjacent magnet. Thus, the rigid body 430 moves dependent only upon the position of the eccentric center of gravity of the disk 1 (see FIG. 2) and the rotation of tube 410.

Further, the rigid body 430 is preferably formed of a non-oxidizing substance or anti-oxidation coated, since smooth rolling or sliding of the rigid body 430 inside the race 450 will be hindered by oxidation, i.e., corrosion.

For that purpose, the rigid body 430 can be formed of a substance such as SUS300, ceramic or synthetic resin. Also, the outer surface of the rigid body 430 can be anti-oxidation processed by coating a base material of carbon steel or chromium steel with zinc or nickel-chromium plating.

Also, the rigid body 430 can be formed of a substance having fine particles when oxidized with the air, so that the movement of the rigid body 430 is not affected.

The shapes of the race 450 and the cover member 413 will now be described with reference to FIGS. 13 through 16.

Figure 13:
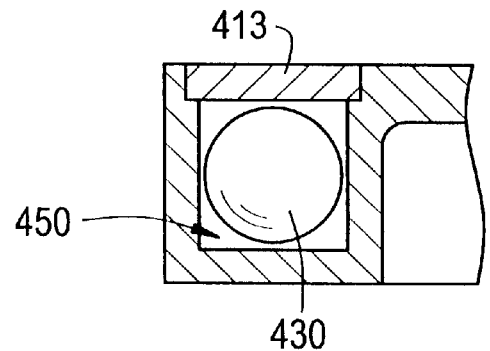
FIGS. 13 through 16 are sectional views schematically illustrating the race and a cover member of the self-compensating dynamic balancer according to the embodiment of the present invention.
Figure 14:
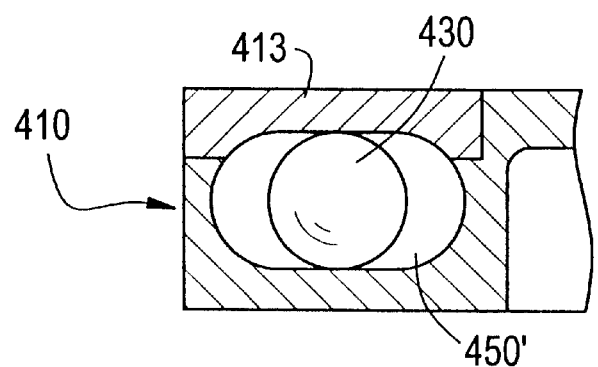

As shown in FIG. 13, it is preferable that the section through the race 450 and the cover member 413 is rectangular. In FIG. 14, the cross-section of the race 450' and the cover member 413 is an oval. Thus, by reducing the height of the tube 410, the internal vibratory force generated during rotation of the tube 410 can be effectively alleviated.

Figure 15:
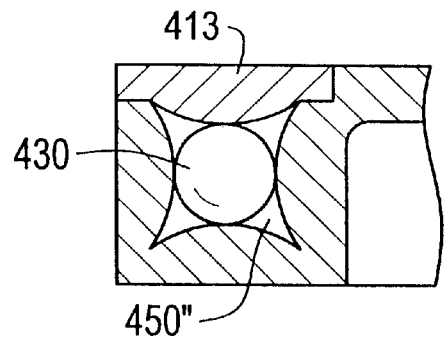

Also, as shown in FIG. 15, the cross-section of the race 450" bulges inward. Such a case is very appropriate for minimizing the contact area between the rigid body 430 and the race 450".

Figure 16:
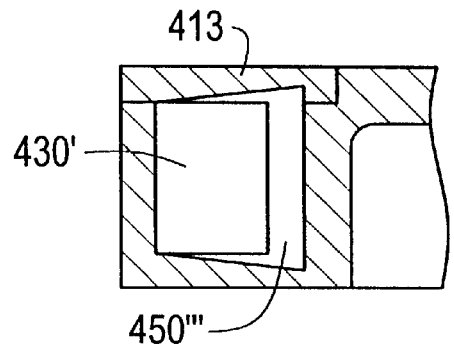

Further, as shown in FIG. 16, the inner wall of the race 450'" is formed to be higher than the outer wall so that the upper and lower surfaces of the race 450'" are at an angle. Thus, when the cylindric rigid body 430' (see FIG. 10) is employed, sliding movements of the rigid body 430' inside the race 450'" can be minimized.

It is preferable that the tube 410 including a race 450 and a cover member 413 are formed of a non-magnetic substance to effectively prevent the influence of a magnetic force between the rigid body 430 and the race 450. That is, the tube 410 and the cover member 413 may be formed of a substance such as tungsten carbide (WC), beryllium steel (CuBe), Hastelloy C-276, silicon nitride ($Si_3N_4$), zirconia ($ZrO_2$), brass, aluminum, austenite-series stainless steel YHD50, a non-magnetic metal such as SUS300, SUS304 and SUS316, ceramic or a synthetic resin.

Also, the tube 410 is preferably formed of a non-oxidizing substance such as SUS300, ceramic or a synthetic resin or anti-oxidation coating of zinc or by nickel-chromium plating over a base material of carbon steel or chromium steel.

Figure 17:
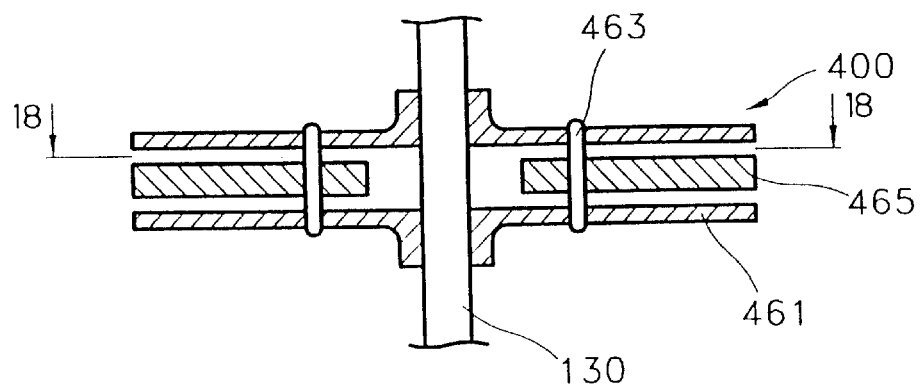
FIG. 17 is a sectional view illustrating a second embodiment of a self-compensating dynamic balancer which is employed in a disk player according to the present invention.
Figure 18:
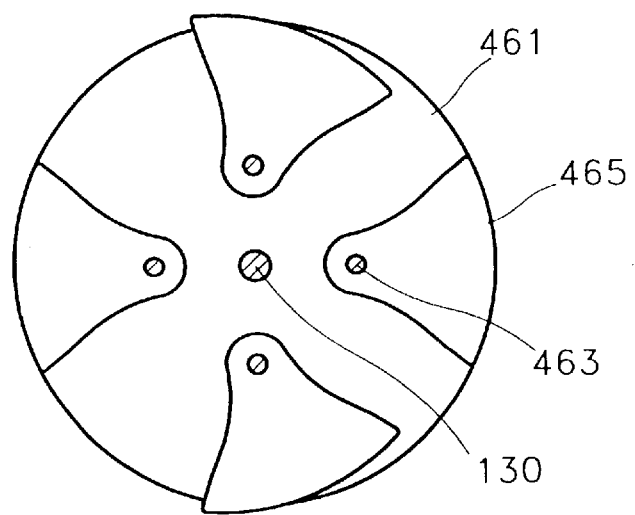
FIG. 18 is a sectional view taken along line 18—18 of FIG. 17.

As shown in FIGS. 17 and 18, a third embodiment of the self-compensating dynamic balancer 400 includes a support plate 461 perpendicularly fixed to the rotational shaft 130 and at least one pivoting plate 465 hinge-coupled to the support plate 461 being parallel to the same. In this case, it is preferable that a pair of the support plates 461 is provided parallel with each other and the pivoting plate(s) 465 is (are) coupled therebetween. The pivoting plate 465 is pivot-coupled between the support plates 461 by a fixing pin 463.

Figure 19:
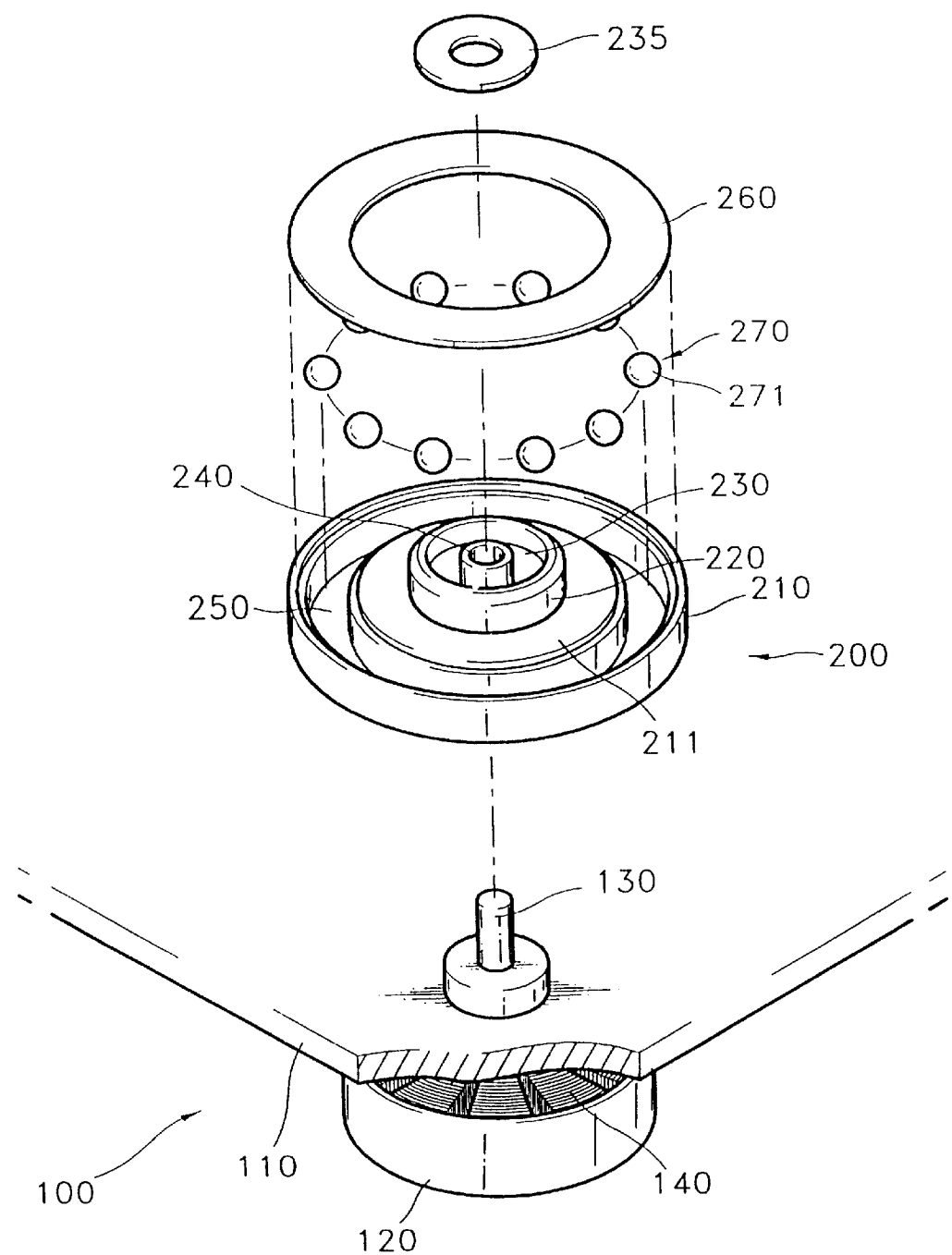
FIG. 19 is an exploded perspective view illustrating a turntable incorporating a self-compensating dynamic balancer employed by a disk player according to a first embodiment of the present invention.
Figure 20:
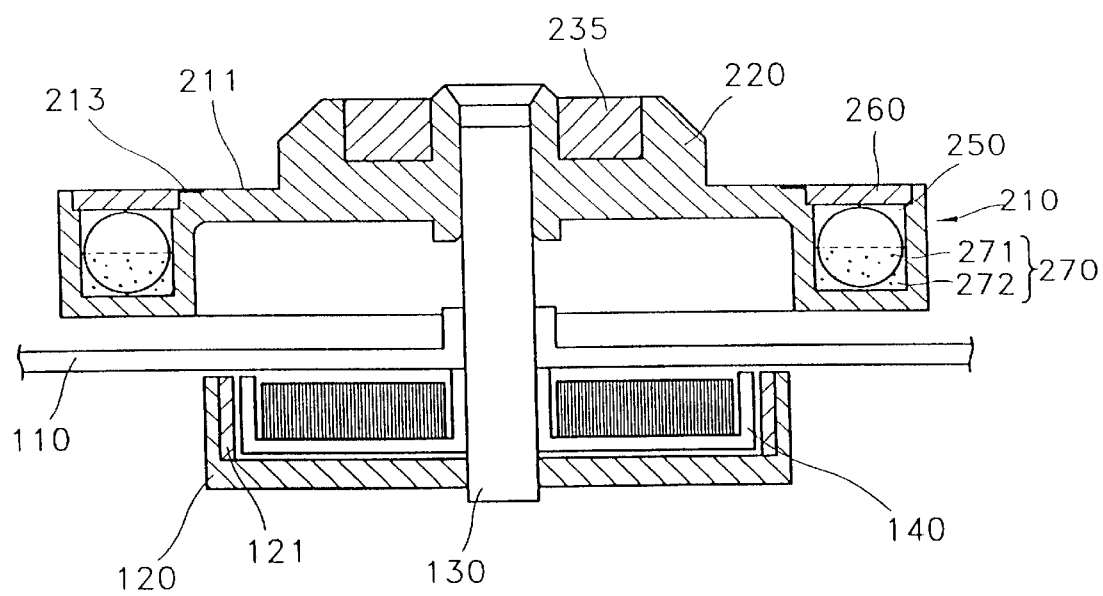
FIG. 20 is a sectional view of the turntable incorporating a self-compensating dynamic balancer shown in FIG. 19 when a rigid body and a fluid are employed as a mobile unit of a self-compensating dynamic balancer according to the embodiment of the present invention.

Referring to FIGS. 19 and 20, a turntable 200 incorporating a self-compensating dynamic balancer according to a first embodiment of the present invention will now be described.

A placing member 210 of the turntable 200 is coupled to the rotational shaft 130 of the spindle motor 100. For that purpose, a coupling hole 240 is formed at the center of the placing member 210 so that the rotational shaft 130 is inserted into and is fixed to the inside of the coupling hole 240. A circular locating protrusion 220 which fits through the center hole of the disk 1 (see FIG. 2) is formed on an upper surface of the placing member 210. The locating protrusion 220 is concentric with the coupling hole 240. A circular race 250 is formed in the placing member 210 around the locating protrusion 220. A mobile unit 270 which includes rigid bodies 271 that can move away from the rotation center of the placing member 210 due to a centrifugal force is inserted into the race 250. The race 250 is sealed by a cover member 260 with the mobile unit 270 inside. After the cover member 260 is assembled onto the upper portion of the placing member 210, the upper surface of the cover member 260 is processed to be a flat surface appropriate for contact with the surface of the disk 1.

The cover member 260 and the placing member 210 are coupled using an adhesive, a groove and protrusion assembly, or a screw. A detailed description thereof will be omitted since such coupling techniques are well-known. As shown in the drawing, an open portion of the race 250 can be formed on the entire upper surface of the race 250 or on a portion of the upper surface thereof being large enough to allow insertion of the mobile unit 270 into the race 250.

Also, the turntable 200 preferably includes a magnet 235 to firmly hold the disk 1 against the surface of the placing member 210 together with the clamper 300 (see FIG. 2) by a magnetic attraction therebetween. The magnet 235 is inserted into an installation groove 230 formed between the coupling hole 240 and the locating protrusion 220.

A placing surface 211 processed to be a flat surface to contact the surface of the disk 1 is provided on upper surface of the placing member 210 between the race 250 and the locating protrusion 220. A frictional member 213 can be installed to increase the friction between the disk 1 and the placing surface 211 to prevent the slip of the disk 1 with respect to the placing member 210.

The mobile unit 270 comprises a plurality of the rigid bodies 271 and/or a fluid 272 which can be moved away from the center of the placing member 210 due to the centrifugal force generated during rotation of the placing member 210.

FIG. 19 shows an example in which a plurality of rigid bodies 271 is included as a mobile unit 270 inside the race 250. The rigid bodies 271 can freely roll or slide according to the centrifugal force during rotation of the placing member 210.

As in the embodiment shown with reference to FIGS. 9 through 12, the shape of the rigid body 271 located inside the race 250 is preferably spherical, cylindrical, has a truncated conic body or is a fan-shaped block. However, the shape of the rigid body 271 may be modified into other shapes as long as the body can freely move inside the race 250.

A fluid 272 can be further included together with the rigid body 271 as the mobile unit 270. Since the fluid 272 has a larger contact area with respect to the race 250 and the cover member 260 and exhibits a very high viscosity compared to the rigid body 271, the fluid 272 employed with the rigid body 271 inside the race 250 can effectively compensate for an inside vibratory force generated due to the eccentric center of gravity of the disk 1 (see FIG. 2).

The amount of fluid 272 that can be included ranges from an amount which coats the outer surface of the rigid bodies 271 to a thickness of only a few microns. In this case, the fluid 272 reduces friction between the rigid bodies 271, the race 250 and the cover member 260, rather than actually contributing to balancing.

When the rigid body 271 is formed of the non-magnetic substance, the rigid body 271 is not influenced by the magnetic force from the magnet 235 installed inside the locating protrusion 220 or a magnet (not shown) around the placing member 210. Thus, the rigid body 271 moves smoothly dependent only upon the position of the eccentric center of gravity of the disk 1 and the rotation of the placing member 210.

Further, the rigid body 271 is preferably formed of a non-oxidizing substance or anti-oxidation coating, since rolling or sliding of the rigid body 271 inside the race 250 is hindered by oxidation, i.e., corrosion. Also, the rigid body 271 can be formed of a substance having fine particles when oxidized in air, so that the movement of the rigid body 271 is not affected.

Also, the fluid 272 can be employed without the rigid bodies 271 as the mobile unit 270. In such a case, the cover member 260 and the race 250 are sealed to each other to prevent leakage of the fluid 272.

As in the embodiment with reference to FIGS. 13 through 16, the section of the race 250 and the cover member 260 is rectangular in shape as at 450, an oval 450', or inwardly bulging 450". Also, the inner wall of the race 250 is formed to be higher than the outer wall of the same so that a race in which the upper and lower surfaces of the race 250 are at an angle is possible (as in race 450''').

It is preferable that the placing member 210 including race 250 and the cover member 260 are formed of a non-magnetic substance to effectively prevent the influence of a magnetic force between the rigid bodies 271 and the race 250. That is, the placing member 210 and the cover member 260 are formed of a substance such as tungsten carbide (WC), beryllium steel (CuBe), Hastelloy C-276, silicon nitride ($Si_3N_4$), zirconia ($ZrO_2$), brass, aluminum, austenite-series stainless steel YHD50, a non-magnetic metal such as SUS300, SUS304 and SUS316, ceramic or a synthetic resin.

Also, the placing member 210 is preferably formed of a non-oxidizing substance such as SUS300, ceramic or a synthetic resin or an anti-oxidation coating of zinc or by nickel-chromium plating over a base material of carbon steel or chromium steel.

Figure 21:
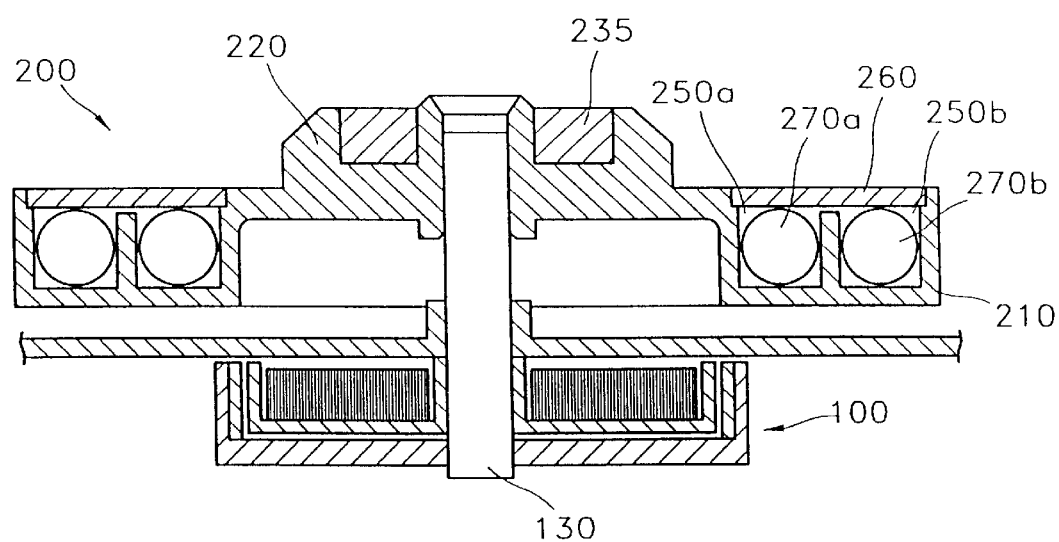
FIG. 21 is a sectional view showing a second embodiment of a turntable incorporating a self-compensating dynamic balancer which is employed in a disk player according to the present invention.

Referring to FIG. 21, a turntable 200 incorporating a self-compensating dynamic balancer according to the second embodiment of the present invention will now be described.

As shown in the drawing, the turntable 200 includes a placing member 210, a locating protrusion 220 formed to be protruding from the center of the placing member 210 to insert into the center hole of the disk 1 (see FIG. 2), a circular race 250 formed inside the placing member 210, a mobile unit 270 installed to be capable of moving inside the race 250, and a cover member 260 for covering the open portion of the race 250. Here, it is a characteristic feature that first and second races 250a and 250b are provided which are formed concentric and adjacent to each other with respect to the center of the placing member, differently from the first embodiment. First and second mobile units 270a and 270b shaped as described above are inserted into the first and second races 250a and 250b, respectively.

The mobile units 270a and 270b comprise one of a variously shaped rigid body 271 and/or a fluid 272 as described with reference to FIGS. 9 through 12. When the rigid. bodies 271 are included as the mobile unit 270, it is preferable that the rigid bodies 271 are formed of a non-magnetic substance, a non-oxidizing substance, or is anti-oxidation coated. Also, the shape of each section of the first and second races 250a and 250b is one of those described with reference to FIGS. 13 through 16.

In this case, it is preferable that the masses of the respective mobile units 270a and 270b inserted in the first and second races 250a and 250b are different from each other.

This is because of the consideration that a centrifugal force applied to the mobile unit 270 during the rotation of the placing member 210 is proportional to the respective mass of the mobile unit 270 and the distance between the center position of the mobile unit 270 and the rotation center of the placing member 210. That is, the diameters of the first and second races 250a and 250b and the mass of the mobile unit 270 are determined by considering the allowable error of the eccentric center of gravity of the disk.

Although the turntable 200 having two races 250a and 250b is described in FIG. 21, the turntable can be provided with two or more races.

A clamper 300 incorporating a self-compensating dynamic balancer according to a first embodiment of the present invention will be described in detail with reference to FIGS. 22 through 26.

Figure 22:
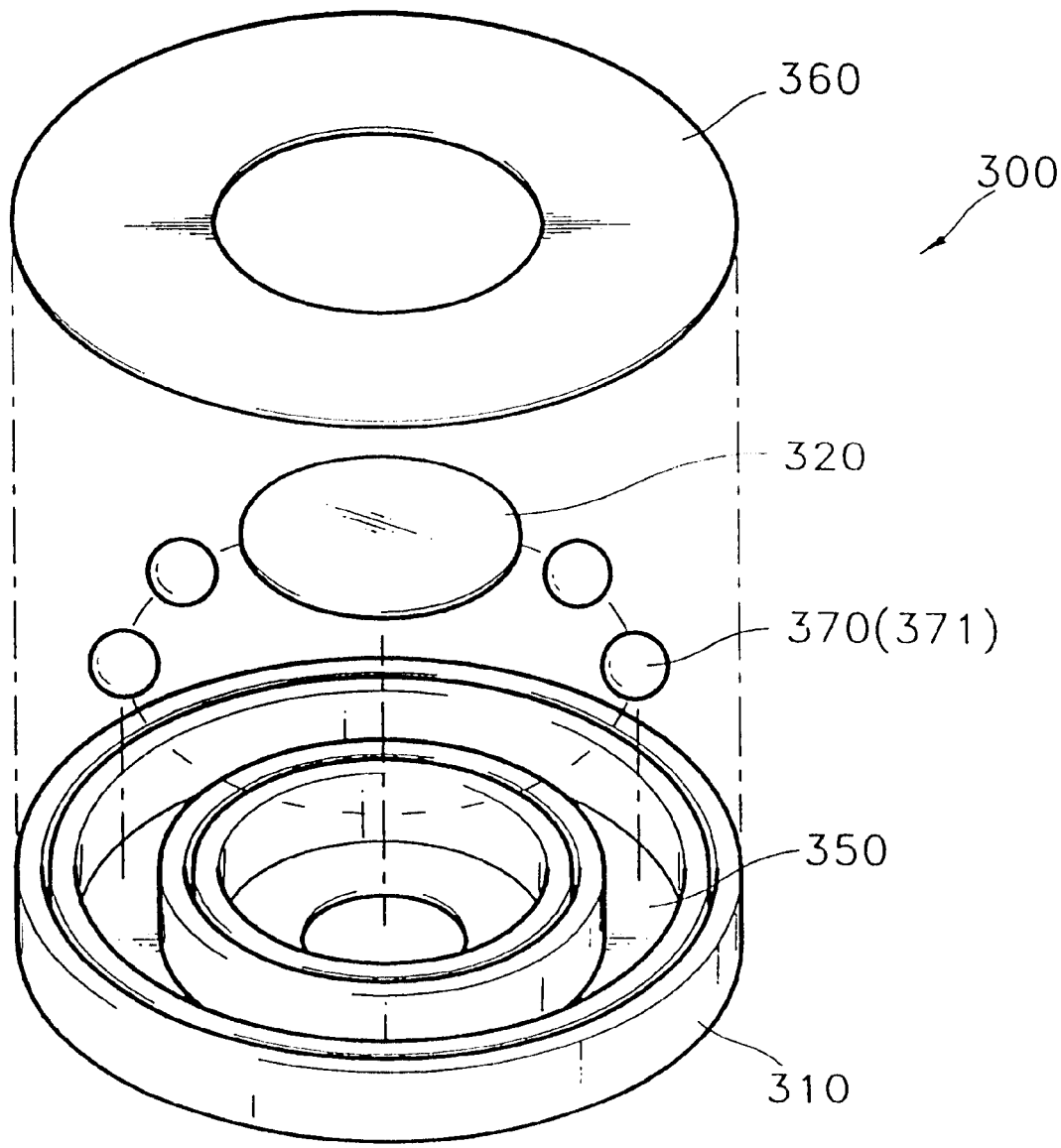
FIG. 22 is an exploded perspective view of a first embodiment of a clamper incorporating a self-compensating dynamic balancer which is employed in a disk player according to the present invention.
Figure 23:
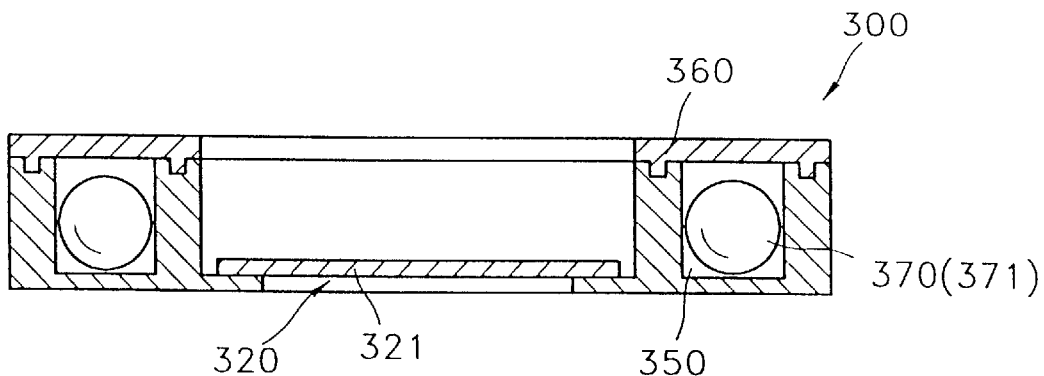
FIG. 23 is a sectional view of the clamper incorporating a self-compensating dynamic balancer shown FIG. 22 when a yoke is employed as a pressing unit.

As shown in FIGS. 2 and 22, the damper 300 incorporating a self-compensating dynamic balancer 400 according to the first embodiment of the present invention is positioned on the turntable 200 by the bracket 301 coupled with the deck base 50 and holds the disk 1 in place on the turntable 200. Referring to FIGS. 22 and 23, the clamper 300 incorporating a self-compensating dynamic balancer 400 of the present invention includes a clamper main body 310, a pressing unit 320, a race 350, a mobile unit 370 and a cover member 360. The damper main body 310 is installed on the deck base 50 to perform a motion relative to the turntable 200. The pressing unit 320 is installed at the clamper main body 310 to press the disk 1 in place on the turntable 201. The race 350 is formed inside the clamper main body 310 and is concentric with the rotation center of the damper main body 310. The mobile unit 370 is installed to be capable of moving inside the race 350 and moves toward the outer circumference of the clamper main body 310 due to a centrifugal force generated during the rotation of the damper main body 310. The cover member 360 covers the open portion of the race 350.

The cover member 360 and the race 350 are coupled using an adhesive, a groove and protrusion assembly formed at corresponding positions, or a screw. A detailed description thereof will be omitted since such coupling techniques are well-known.

As shown in the drawing, the open portion of the race 350 can be formed on the entire upper surface of the race 350 or on a portion of the upper surface thereof being large enough to allow the mobile unit 370 to be inserted into the race 350.

The pressing unit 320 can be a yoke 321 coupled to the lower portion inside the damper main body 310 as shown in FIG. 23.

As shown in FIGS. 19 through 21, when the magnet 235 is provided to the turntable 200, the yoke 321 presses the disk 1 (see FIG. 2) using the mutual magnetic attraction of the magnet 235.

Figure 24:
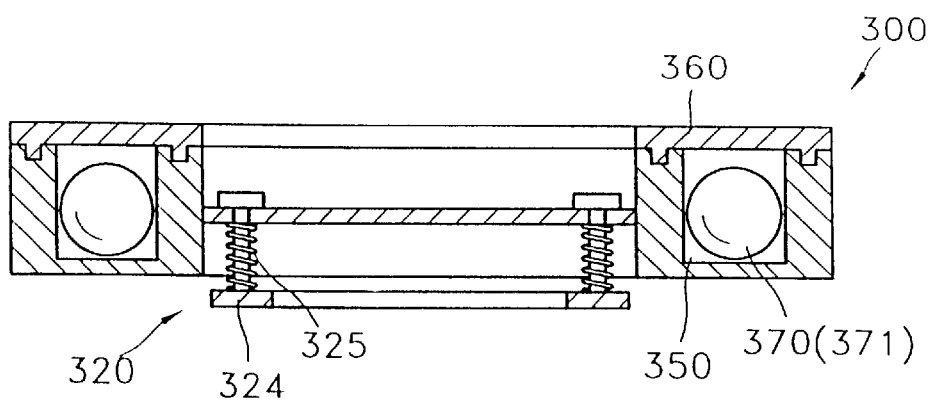
FIG. 24 is a sectional view of the clamper incorporating a self-compensating dynamic balancer shown FIG. 22 when a pressing plate and an elastic member are employed as a pressing unit.

Also, the pressing unit 320 may be a pressing plate 324 and an elastic member 325, as shown in FIG. 24. The pressing plate 324 is installed at the lower surface of the damper main body 310 to be capable of s moving up and down. The elastic member 325 is interposed between the damper main body 310 and the pressing plate 324 to allow the pressing plate 324 to elastically press the disk 1 (see FIG. 2).

Accordingly, when the turntable 200 moves relatively to the damper main body 310, e.g., the turntable 200 is lifted while the damper main body 310 is stationary so that the turntable is in proximity with the damper main body 310 and the disk 1 placed on the turntable 200 is held by the pressing unit 320. Consequently, the clamper main body 310 rotates, being engaged with the rotating turntable.

The mobile unit 370 includes a plurality of rigid bodies 371 and/or a fluid 372 to move away from the rotation center of the rotating clamper main body by the centrifugal force inside the race 350.

FIGS. 22 through 24 show cases in which a plurality of rigid bodies 371 are included inside the race 350 as the mobile unit 370. The rigid bodies 371 are installed to be capable of freely rolling or sliding such that the position thereof can be determined by the centrifugal force during rotation of the placing member.

It is preferable that the rigid body 371 is spherical, cylindrical, has a truncated conic shape, or is a fan-shaped block, as shown in FIGS. 9 through 12. However, the shape of the rigid body 371 may be modified on the condition that the rigid body 371 can freely move inside the race 350.

Figure 25:
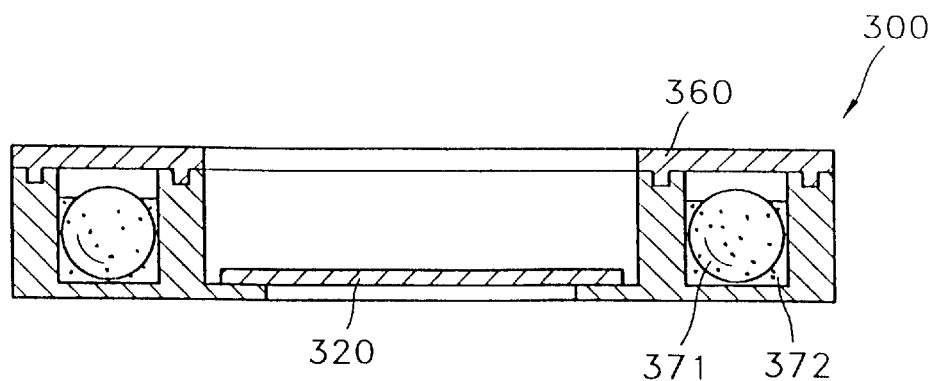
FIG. 25 is a sectional view of the clamper incorporating a self-compensating dynamic balancer shown FIG. 22 when a rigid body and a fluid are employed as a mobile unit.

As shown in FIG. 25, the fluid 372 can be further utilized along with the rigid bodies 371 as the mobile unit 370. Since the fluid 372 has a large contact area with respect to the race 350 and the cover member 360 and exhibits very high viscosity compared to the rigid bodies 371, the fluid 372 employed with the rigid bodies 371 inside the race 350 can effectively compensate for an inside vibratory force generated due to the eccentric center of gravity of the disk 1 (see FIG. 2).

It is preferable that the rigid body 371 is formed of a non-magnetic substance to be free from the influence of the magnetic force of the magnet 235 (see FIG. 19). In this case, the movement of the rigid body 371 is determined dependent only on the eccentric center of gravity position of the disk 1 and the rotation of the clamper main body 310.

Also, the rigid body 371 is preferably formed of a non-oxidizing substance or is anti-oxidation coated to prevent the smooth rolling or sliding of the rigid body 371 inside the race 350 from being hindered by oxidation, i.e., corrosion. Also, the rigid body 371 can be formed of a substance having fine particles when oxidized in air, so that the movement of the rigid body 371 is not affected.

The fluid 372 can be employed without the rigid bodies 371 as the mobile unit 370.

The shapes of a portion formed by the race 350 and the cover member 360 where the mobile unit 370 is a shape described with reference to FIGS. 13 through 16. That is, the cross section has a rectangular shape, an oval shape, or an inwardly bulging shape.

Also, it is preferable that the damper main body 310 including the race 350 and the cover member 360 are formed of a non-magnetic substance to be free from influence of a magnetic force generated between the rigid bodies 371 and the race 350. Further, the clamper main body 310 is preferably formed of a non-oxidizing substance or is anti-oxidation coated.

Figure 26:
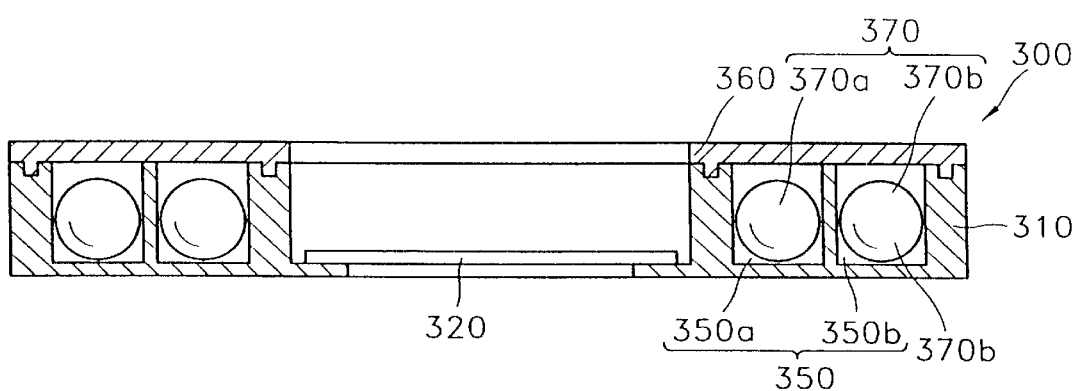
FIG. 26 is a sectional view showing a second embodiment of a clamper incorporating a self-compensating dynamic balancer which is employed in a disk player according to the present invention.

Referring to FIG. 26, the damper 300 incorporating a self-compensating dynamic balancer 400 according to the second embodiment of the present invention will now be described.

As shown in the drawing, the clamper 300 includes a clamper main body 310, a pressing unit 320 installed at the clamper main body 310 and which presses the disk 1 (see FIG. 2) in place on the turntable 200, a circular race 350 formed inside the clamper main body 310 and concentric with the rotation center of the clamper main body 310, a mobile unit 370 installed to be capable of moving inside the race 350, and the cover member 360 for covering an open portion of the race 350. In this case, a characteristic feature of the present embodiment which distinguishes it from the first embodiment is that first and second races 350a and 350b formed adjacent to each around the rotation center of the clamper main body 310 (see FIG. 4) are provided as the race 350.

As described referring to FIGS. 9 through 12, the mobile unit 370 includes a rigid body 371 of various shapes and/or a fluid 372. In the case that the rigid bodies 371 are included as the mobile unit 370, it is preferable that the rigid bodies 371 are formed of a non-magnetic, non-oxidizing substance, or are anti-oxidation coated. Also, the sectional shapes of each of the first and second races 350a and 350b are the same as those described earlier referring to FIGS. 13 through 16.

It is preferable that each of the mobile units 370a and 370b respectively located in the first and second races 350a and 350b have a different weight.

This is because of the consideration that the centrifugal force applied to the mobile units 370a and 370b during the rotation of the damper main body 310 is proportional to the mass of the respective mobile unit 370 and the distance between the center of the mobile unit 370 and the center of rotation of the clamper main body 310. That means that the diameters of the first and second races 350a and 350b and the mass of the mobile unit 370a and 370b are determined considering the allowable error of the disk eccentric center of gravity.

Although FIG. 26 shows the damper 300 having two races 350a and 350b, it is possible to have two or more races 350 provided to the clamper incorporating a self-compensating dynamic balancer 400.

A spindle motor incorporating a self-compensating dynamic balancer employed in a disk player according to an embodiment of the present invention will now be described in detail with reference to FIGS. 27 through 30.

The spindle motor incorporating a self-compensating dynamic balancer according to the present invention is installed at the deck plate 70 and rotates the turntable 200 coupled on the rotational shaft 130, as shown in FIG. 2.

The spindle motor 100 according to a first embodiment of the present invention includes a motor base 110, a rotational shaft 130, a stator 140, a rotor 120, first and second bearings 132 and 134, a circular race 150 integrally formed inside the rotor 120, a mobile unit 170 installed inside the race 150, and a cover member 160 for covering the opening of the race 150.

The motor base 110 is coupled with the deck plate 70 (see FIG. 2) and has a through hole 111. The rotational shaft 130 together with the bearings 132 and 134 inserts into the through hole 111.

The stator 140 is fixed to the bottom surface of the motor base 110 and includes a yoke 141 facing the rotor 120 and a coil member 143 disposed at the inner side of the yoke 141. The bearings 132 and 134 which are disposed between the through hole 111 and the rotational shaft 130 support the shaft 130 in the radial and axial directions thereof. Accordingly, a pair of the bearings 132 and 134 is provided and disposed inside the through hole 111 separated by a predetermined distance. That is, the inner ring of the first bearing 132 is fixed to the rotational shaft 130 and the outer ring thereof is fixed within the through hole 111 so movements in the radial and axial directions of the rotational shaft 130 are prevented. The second bearing 134 is inserted into the through hole 111 to be capable of sliding therein in order to prevent the rotational shaft 130 from being angled. An elastic member 131 is disposed inside the through hole 111 between the first bearing 132 and the second bearing 134 to alleviate the rotational vibration of the rotor 120 being transmitted to the motor base 110. It is preferable to use a metal bearing as the bearings 132 and 134 considering the positional accuracy necessary for high-speed rotation. Also, it is possible to employ other types of bearings such as a ball bearing or a dynamic pneumatic bearing.

The rotor 120 includes a case 121 fixed to one end of the rotational shaft 130 and installed to enclose the stator 140 and a magnet 123 fixed inside the case 121 to surround the yoke 141. A fixing member 133 is further included at the coupling between the case 121 and the rotational shaft 130 to prevent the rotational shaft 130 from slipping off or running idly with respect to the case 121.

The race 150 is formed integrally with the case 121, and inside the case 121, concentric with the rotational shaft 130. The mobile unit 170 is installed to be capable of moving inside the race 150 and moves toward the outer circumference of the race 150 due to a centrifugal force generated during the rotation of the case 121. The cover member 160 covers the opening of the race 150.

The cover member 160 and the race 150 are coupled using an adhesive, a groove and protrusion assembly formed at corresponding positions, or screws.

The opening of the race 150 can be formed throughout the entire surface of the upper surface of the race 150, as shown in the drawing, or formed as part of the upper surface of the race 150, in a size large enough to insert the mobile unit 170 into the race 150.

The mobile unit 170 comprises a plurality of the rigid bodies 171 and/or a fluid 172 installed to be capable of moving away from the rotation center of the rotor 120 inside the race 150 during the rotation of the rotor 120.

Figure 27:
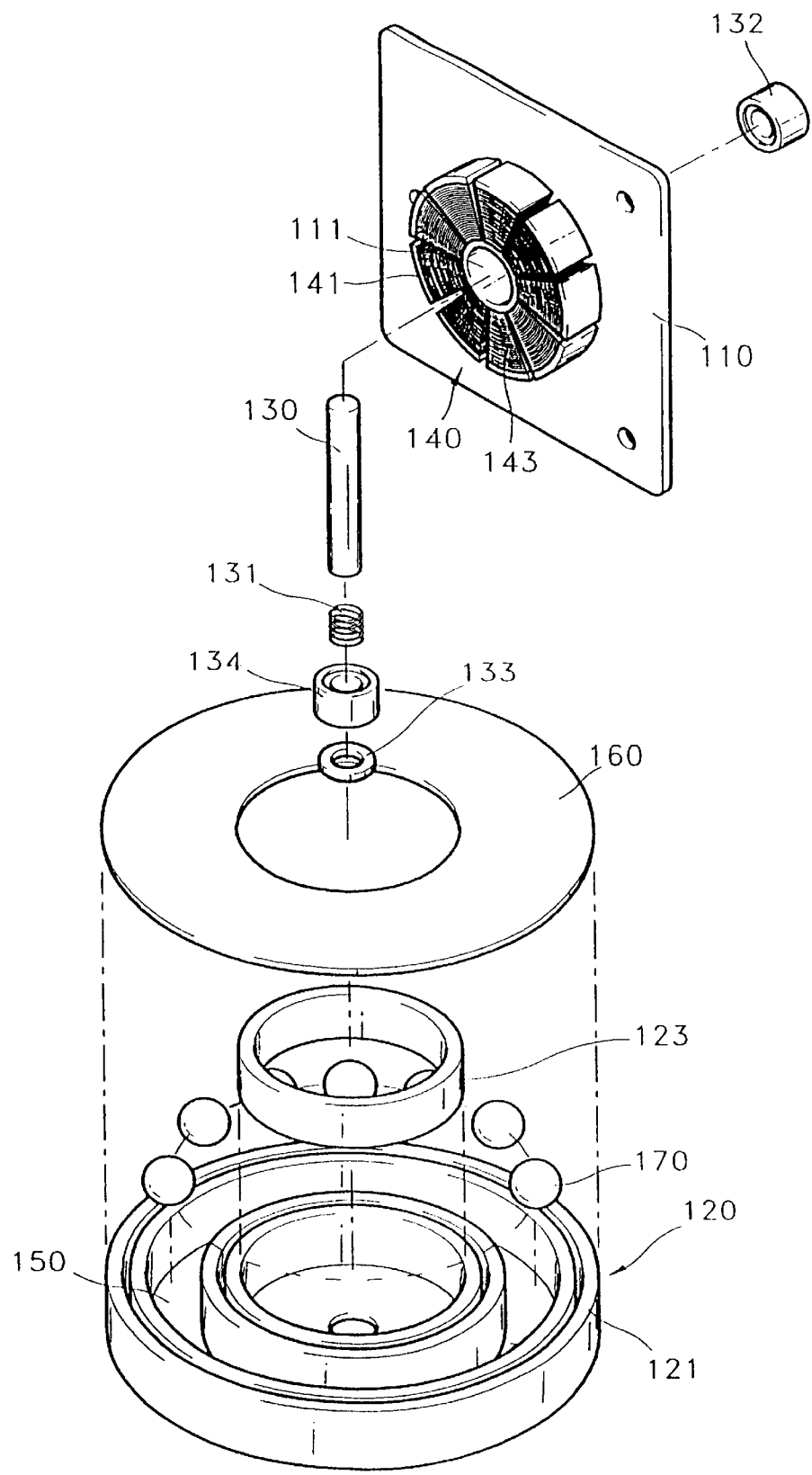
FIG. 27 is an exploded perspective view of a first embodiment of a spindle motor incorporating a self-compensating dynamic balancer which is employed in a disk player according to the present invention.
Figure 28:
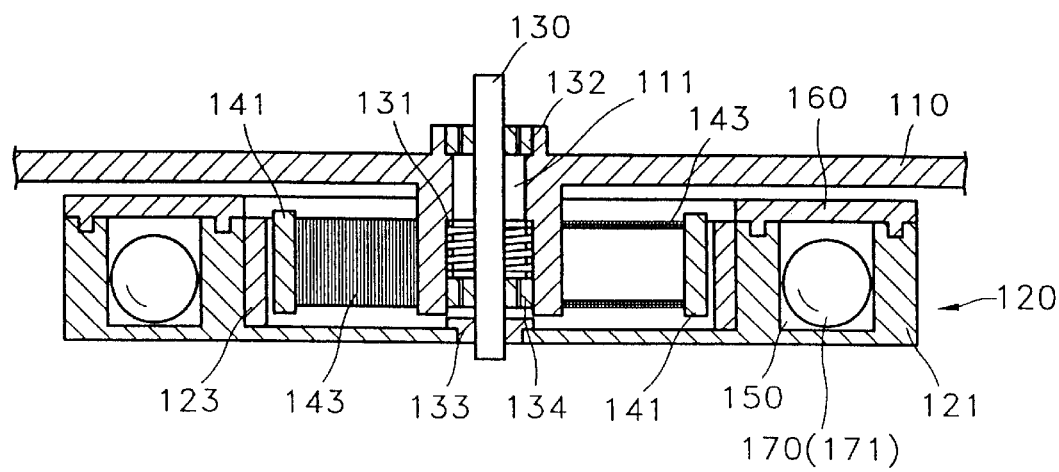
FIG. 28 is a sectional view of the spindle motor incorporating a self-compensating dynamic balancer shown FIG. 27 when a rigid body is employed as a mobile unit.

FIGS. 27 and 28 show a case in which a plurality of rigid bodies 171 is included as the mobile unit 170 inside the race 150. The rigid bodies 171 are installed to be capable of freely rolling or sliding such that the position of the rigid bodies 171 can be determined according to the centrifugal force generated during the rotation of the rotor 120.

It is preferable that the rigid body 171 is spherical, cylindrical, has a truncated conic shape, or is a fan-shaped block, as shown in FIGS. 9 through 12. Further, the shape of the rigid body 171 may be modified on the condition that the rigid body 171 can freely move inside the race 150.

Figure 29:
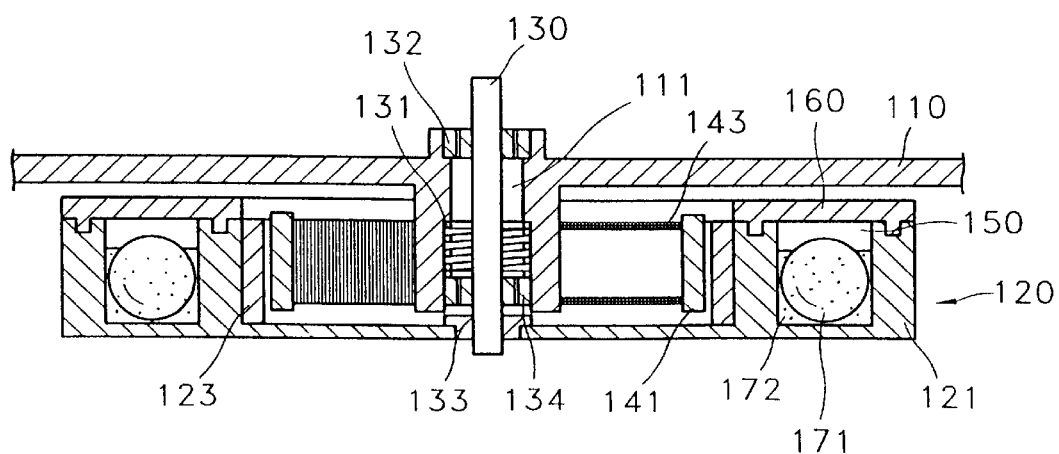
FIG. 29 is a sectional view of the spindle motor incorporating a self-compensating dynamic balancer s shown FIG. 27 when a rigid body and a fluid are employed as a mobile unit.

As shown in FIG. 29, the fluid 172 can be further utilized along with the rigid bodies 171 as the mobile unit 170. Since the fluid 172 has a large contact area with respect to the race 150 and the cover member 160 and exhibits very high viscosity compared to the rigid bodies 171, the fluid 172 employed with the rigid bodies 171 inside the race 150 can effectively compensate for an internal vibratory force generated due to an eccentric center of gravity of the disk 1 (see FIG. 2).

It is preferable that the rigid bodies 171 are formed of a non-magnetic substance to be free from influence of the magnetic force of the magnet 123 (see FIG. 27), so that the movement of the rigid bodies 171 is determined dependent on the eccentric center of gravity position of the disk 1 and the rotation of the rotor 120.

Also, the rigid bodies 171 are preferably formed of a non-oxidizing substance or are anti-oxidation coated to prevent the smooth rolling or sliding of the rigid bodies 171 inside the race 150 from being hindered by oxidation, i.e., corrosion. Also, the rigid bodies 171 can be formed of a substance having fine particles when oxidized in air, so that the movement of the rigid bodies 171 is not affected.

The fluid 172 can be employed without the rigid bodies 171 as the mobile unit 170.

The shapes of a portion formed by the race 150 and the cover member 160 where the mobile unit 170 is placed is the same as those described earlier with reference to FIGS. 13 through 16.

Also, it is preferable that the case 121 including the race 150 and the cover member 160 are formed of a non-magnetic substance to be free from influence of a magnetic force generated between the rigid bodies 171 and itself.

Further, the case 121 is preferably formed of a non-oxidizing substance or is anti-oxidation coated.

Figure 30:
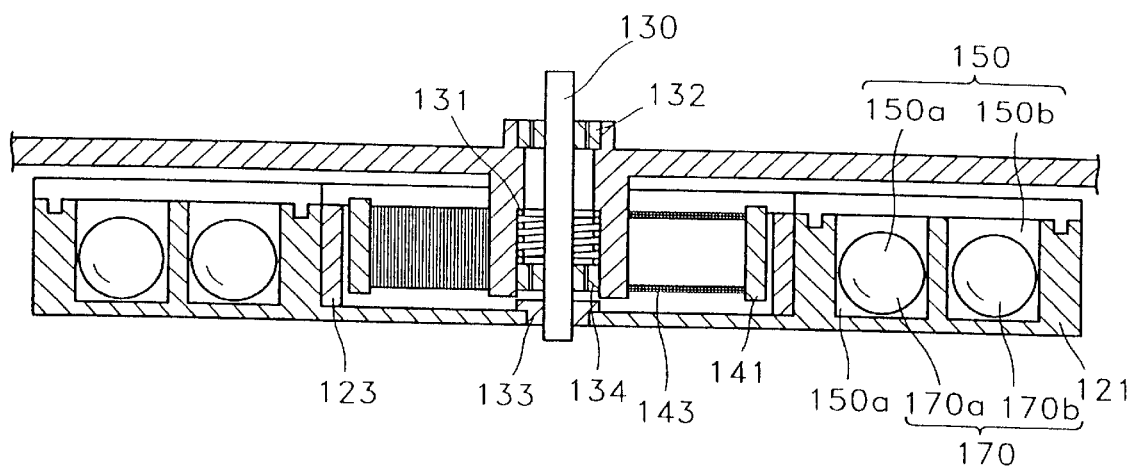
FIG. 30 is a sectional view of a second embodiment of a spindle motor incorporating a self-compensating dynamic balancer which is employed in a disk player according to the present invention.

Referring to FIG. 30, a spindle motor 100 incorporating a self-compensating dynamic balancer employed in a disk player according to a second embodiment of the present invention will now be described.

As shown in the drawing, the spindle motor 100 includes a rotation shaft 130, a motor base 110, bearings 132 and 134, a stator 140, a rotor 120, a circular race 150 formed inside the rotor 120 and concentric with the rotation shaft 130, a mobile unit 170 installed to be capable of moving inside the race 150, and a cover member 160 for covering an opening of the race 150. It is a characteristic feature of the present invention that first and second races 150a and 150b formed adjacent to each other and concentric with the rotor 120 are provided as the race 150, which distinguishes it from the above-described first embodiment.

Since the shape and material of the mobile unit 170, the race 150 and the cover member 160 are the same as those described above, a detailed description thereof will be omitted.

It is preferable that the weights of mobile units 170a and 170b installed in the first and second races 150a and 150b, respectively, are different from each other.

This is because of the consideration that a centrifugal force applied to the case 121 during rotation of the rotor 120 is proportional to the mass of each of the respective mobile units 170a and 170b and the distance between the center of the mobile unit 170 and the rotation center of the rotor 120. That is, the diameter of the first and second races 150a and 150b and the mass of the mobile unit 170a and 170b are determined considering the allowable error of the eccentric center of gravity of the disk 1 (see FIG. 2).

Although a spindle motor 100 having two races 150a and 150b is shown in FIG. 30, it is possible to provide a spindle motor incorporating a self-compensating dynamic balancer 100 with two or more races.

As shown in FIG. 2, a disk player according to a first embodiment of the present invention includes the deck base 50, the deck plate 70, the buffering members 60, the spindle motor 100, the turntable 200 and the clamper 300. The turntable incorporating a self-compensating dynamic balancer 200 is employed as the turntable, as shown in FIGS. 19 through 21.

A disk player according to a second embodiment of the present invention is substantially the same as that of the first embodiment, but a clamper incorporating a self-compensating dynamic balancer 300 as described with reference to FIGS. 22 through 26 is employed.

Also, a disk player according to a third embodiment of the present invention is substantially same as that of the first and second embodiments, but the spindle motor incorporating a self-compensating dynamic balancer 100 as described with reference to FIGS. 27 through 30 is employed.

Further, in the disk player of the present invention as described above, the self-compensating dynamic balancer 400 can be integrally formed with not just one of the rotating members such as the turntable 200, the damper 300 and the spindle motor 100 but also two or more of the rotating members considering the rotational speed of the disk 1 (see FIG. 2) and the scope of the allowable error of the position of the eccentric center of gravity.

Hereinafter, the effects of vibration reduction generated when the disk player incorporating a self-compensating dynamic balancer and the rotating members incorporating a self-compensating dynamic balancer, i.e., the turntable 200, the clamper 300 and the spindle motor 100, according to the present invention are operated, will be described with reference to FIGS. 31A and 31B.

Figure 31A:
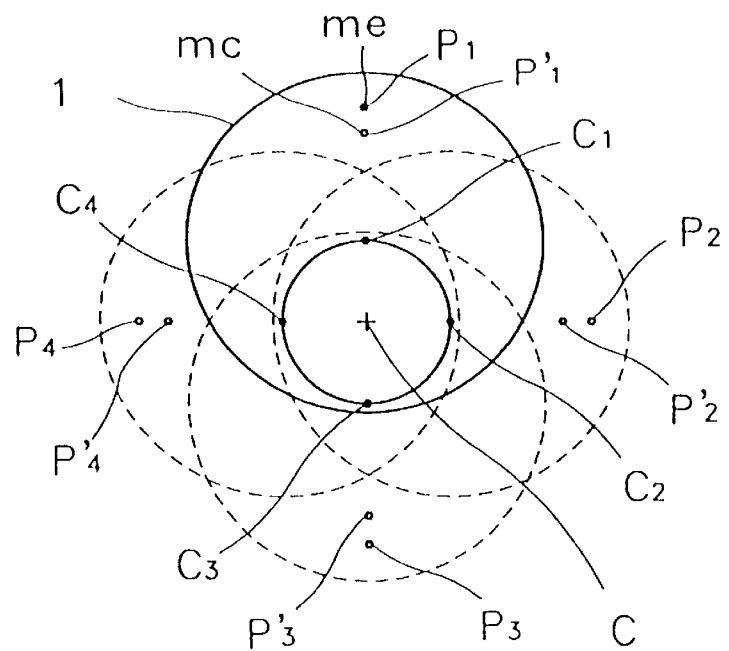
FIGS. 31A and 31B are diagrams showing the relationship between the eccentric center of gravity position of a disk, the position of the rotational shaft and the ideal center of rotation respectively according to different rotational speeds of the disk of the disk player having a self-compensating dynamic balancer according to the present invention.

When the angular frequency of the disk 1 is equal to or less than the natural frequency, as shown FIG. 31A, the position ($p_i$, i=1, 2, 3 and 4) of the eccentric center of gravity $m_e$ of the disk 1 and the position ($p'_i$, i=1, 2, 3 and 4) of a compensated mass $m_c$, i.e., the center of gravity of the self-compensating dynamic balancer including the race, the mobile unit and the cover member, are located opposite the revolution center c, with respect to the corresponding positions ($c_i$, i=1, 2, 3 and 4) of the rotation shaft. Thus, the degree of eccentricity of the rotation becomes large.

Figure 31B:
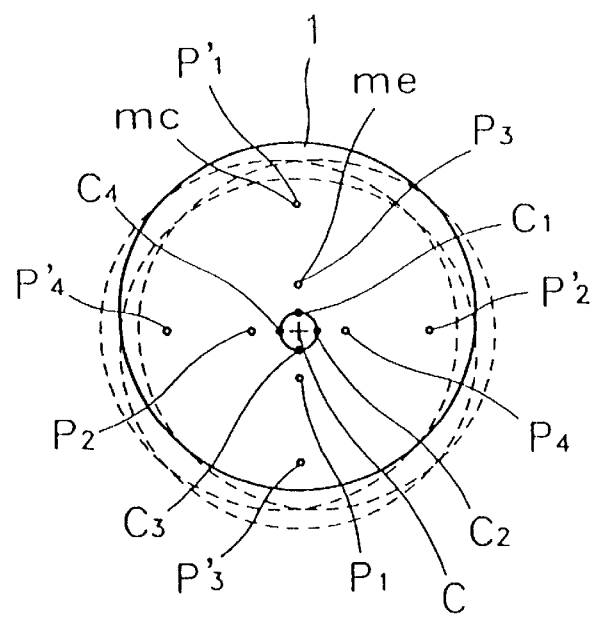

However, when the angular frequency of the disk 1 is much greater than the natural frequency as when the disk rotates at a normal speed, as shown FIG. 31B, the revolution center c and the position ($p_i$, i=1, 2, 3 and 4) of the eccentric center of gravity $m_e$ of the disk 1 are located in the same direction with respect to the rotational shaft, and the position ($p'_i$, i=1, 2, 3 and 4) of the compensated mass $m_c$ is located in the opposite direction due to the centrifugal force. Thus, an unbalanced state generated due to the eccentric center of gravity $m_e$ of the disk 1 is compensated for and the eccentricity of rotation of the rotational shaft is drastically reduced. Consequently, the internal vibratory force of the deck plate due to the eccentric center of gravity $m_e$ of the disk 1 is alleviated.

As described above, the disk player incorporating a self-compensating dynamic balancer, the spindle motor and the rotating members rotated by the spindle motor according to the present invention compensates for the internal vibration generated due to the eccentric center of gravity of a disk, by generating a centrifugal force directed from the orbital center of the disk radially outward which is generated by the mobile unit inside the race. Therefore, the internal vibration generated by the orbital rotation of the eccentric center of gravity of the disk can be effectively limited.

Also, the disk player according to the present invention employing buffering members exhibiting a weak rigidity can alleviate external impacts. Thus, the disk player according to the present invention is appropriate for a high-speed CD drive of greater than 6X-speed, a CD-ROM drive, or a DVD drive.

It is contemplated that numerous modifications may be made to the disk player of the present invention without departing from the spirit and scope of the invention as defined in the following claims.

What is claimed is:

1. A damper incorporating a self-compensating dynamic balancer adopted in a disk player, comprising:
   a damper main body including a base and spaced apart inner and outer circular side walls extending from said base;
   a pressing unit which is installed at said damper main body for pressing a disk placed on a turntable;
   at least one circular race which is unitarily formed in said damper main body by said base and said inner and outer circular side walls and rotates around the center of rotation of said damper main body;
   a mobile unit placed inside said race to be capable of moving; and
   a cover member which covers an opening of said race, wherein said base has a bottom surface for contacting the disk.

2. A damper incorporating a self-compensating dynamic balancer as claimed in claim 1, wherein said mobile unit comprises a rigid body which can roll inside said race during rotation of said damper main body.

3. A damper incorporating a self-compensating dynamic balancer as claimed in claim 2, wherein there is more than one race, and weights of rigid bodies located in each of said races differ from each other.

4. A damper incorporating a self-compensating dynamic balancer as claimed in claim 2, wherein a fluid which can move in said race during rotation of said damper main body is further included as said mobile unit.

5. A clamper incorporating a self-compensating dynamic balancer as claimed in claim 2, wherein said rigid body is formed of a non-magnetic material in order to avoid being influenced by a magnetic force.

6. A damper incorporating a self-compensating dynamic balancer as claimed in claim 5, wherein said rigid body is formed of a substance selected from the group consisting of tungsten carbide (WC), beryllium steel (CuBe), silicon nitride ($Si_3N_4$), zirconia ($ZrO_2$), brass, aluminum, austenite-series steel YHD50, a non-magnetic metal including at least one of SUS300, SUS304 and SUS316, ceramic and synthetic resin.

7. A clamper incorporating a self-compensating dynamic balancer as claimed in claim 2, wherein said rigid body is formed of a non-oxidizing substance which does not corrode.

8. A clamper incorporating a self-compensating dynamic balancer as claimed in claim 7, wherein said rigid body is formed of a substance selected from the group consisting of SUS300, ceramic and a synthetic resin.

9. A clamper incorporating a self-compensating dynamic balancer as claimed in claim 2, wherein an outer circumferential surface of said rigid body is anti-oxidation coated.

10. A damper incorporating a self-compensating dynamic balancer as claimed in claim 9, wherein said anti-oxidation coating is formed of a material selected from the group consisting of zinc and nickel-chromium plated over a base material of carbon steel or chromium steel.

11. A clamper incorporating a self-compensating dynamic balancer as claimed in claim 2, wherein said rigid body is shaped as one among a ball type, a cylindrical body, a truncated conic body, and a fan-shaped block.

12. A damper incorporating a self-compensating dynamic balancer as claimed in claim 2, wherein surfaces of said damper main body and said cover member facing said rigid body are anti-oxidation coated.

13. A clamper incorporating a self-compensating dynamic balancer as claimed in claim 12, wherein said anti-oxidation coating is formed of a material selected from the group consisting of zinc and nickel-chromium plated over a base material of carbon steel or chromium steel.

14. A clamper incorporating a self-compensating dynamic balancer as claimed in claim 1, wherein said mobile unit comprises a fluid which can slide in said race during rotation of said clamper main body.

15. A clamper incorporating a self-compensating dynamic balancer as claimed in claim 1, wherein said clamper main body and said cover member are formed of a non-magnetic material in order to avoid being influenced by a magnetic force.

16. A damper incorporating a self-compensating dynamic balancer as claimed in claim 15, wherein said damper main body and said cover member are formed of a substance selected from the group consisting of tungsten carbide (WC), beryllium steel (CuBe), silicon nitride ($Si_3N_4$), zirconia ($ZrO_2$), brass, aluminum, austenite-series steel YHD50, a non-magnetic metal including at least one of SUS300, SUS304 and SUS316, ceramic and a synthetic resin.

17. A clamper incorporating a self-compensating dynamic balancer as claimed in claim 1, wherein said clamper main body and said cover member are formed of a non-oxidizing substance which does not corrode.

18. A clamper incorporating a self-compensating dynamic balancer as claimed in claim 17, wherein said clamper main body and said cover member are formed of a substance selected from the group consisting of SUS300, ceramic and a synthetic resin.

19. A damper incorporating a self-compensating dynamic balancer as claimed in claim 1, wherein a cross-section formed by said race and said cover member in which said mobile unit is located has a shape selected from the group consisting of a rectangular shape, an oval shape having a longer axis in a latitudinal direction with respect to the center of rotation, and an inwardly bulging polygonal shape in which a portion of each side bulges inward.

20. A damper incorporating a self-compensating dynamic balancer adopted in a disk player, comprising:
   a damper main body;
   a pressing unit which is installed at said damper main body for pressing a disk placed on a turntable;
   at least one circular race which is formed in said damper main body and rotates around the center of rotation of said damper main body;
   a mobile unit placed inside said race to be capable of moving; and
   a cover member which covers an opening of said race, wherein a bottom surface of said damper main body contacts said disk, and said pressing unit comprises a yoke member which is coupled to a lower portion inside said damper main body in order to press said disk by a magnetic force with said turntable.

21. A damper incorporating a self-compensating dynamic balancer adopted in a disk player, comprising:
   a damper main body;
   a pressing unit which is installed at said damper main body for pressing a disk placed on a turntable;
   at least one circular race which is formed in said damper main body and rotates around the center of rotation of said clamper main body;
   a mobile unit placed inside said race to be capable of moving; and
   a cover member which covers an opening of said race, wherein said pressing unit includes a pressing plate installed at a bottom surface of said damper main body to be capable of moving up and down for pressing said disk, and an elastic member which is interposed between said damper main body and said pressing plate such that said pressing plate can elastically press against said disk.

22. A damper incorporating a self-compensating dynamic balancer adopted in a disk player, comprising:

a damper main body including a base and spaced apart inner and outer circular side walls extending from said base;

a pressing unit which is installed at said damper main body for pressing a disk placed on a turntable;

at least one circular race which is formed in said damper main body by said base and said inner and outer circular side walls and rotates around the center of rotation of said damper main body;

a mobile unit placed inside said race to be capable of moving; and a cover member which covers an opening of said race, wherein said mobile unit comprises a rigid body which can roll inside said race during rotation of said damper main body.

* * * * *